(12) United States Patent
Yoshida et al.

(10) Patent No.: US 6,466,740 B1
(45) Date of Patent: Oct. 15, 2002

(54) LENS-FITTED FILM UNIT PROVIDED WITH FOCUS ADJUSTING MECHANISM

(75) Inventors: Toshio Yoshida, Ibaraki-Ken; Fuminori Kawamura, Kanagawa-Ken; Osamu Noguchi, Kanagawa-Ken; Takashi Tobioka, Kanagawa-Ken, all of (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/564,983

(22) Filed: May 5, 2000

(30) Foreign Application Priority Data

May 6, 1999 (JP) .......................... 11-126284
Jun. 16, 1999 (JP) .......................... 11-169417

(51) Int. Cl.⁷ .......................... G03B 17/02; G03B 17/00
(52) U.S. Cl. .......................... 396/6; 396/72; 396/376; 396/529
(58) Field of Search .......................... 396/6, 63, 72, 396/73, 76, 84, 103, 144, 376, 385, 529, 89, 65, 60; 359/676, 694, 699

(56) References Cited

U.S. PATENT DOCUMENTS

| | | | | |
|---|---|---|---|---|
| 4,560,261 A | * | 12/1985 | Ueda et al. | 396/336 |
| 4,924,248 A | * | 5/1990 | Taniguchi et al. | 396/60 |
| 5,047,792 A | * | 9/1991 | Asano et al. | 396/61 |
| 5,541,686 A | * | 7/1996 | Stephenson | 396/164 |
| 5,815,757 A | * | 9/1998 | Katsura et al. | 396/529 |

* cited by examiner

Primary Examiner—Alan A. Mathews
Assistant Examiner—Arthur A Smith
(74) Attorney, Agent, or Firm—Young & Thompson

(57) ABSTRACT

A lens-fitted film unit has a simple structured lens mechanism that can adapt to photographing under close-up photographing and normal photographing and also with a finder that enable a photographer to check the photographing field from the front in close-up photographing and take pictures including the photographer in a composition.

The unit is provided with a selector member selecting a focus adjusting position between a normal photographing position and a close-up photographing position. The unit has a cylindrical lens holding member fixed to the unit body, a lens holding frame, in which a taking lens is fixed, arranged in the cylindrical lens holding member so as to be able to rotate and move in the direction of light, and a cam mechanism formed between the cylindrical lens holding member and the lens holding frame, and the selector member is arranged in the camera body so as to be movable between a normal photographing position and a close-up photographing position, to rotate the lens holding frame by movement, and cause the lens holding frame to move along the optical axis by the action of the cam mechanism. Adjacent to the photographing field finder, a reflexive mirror to enable to check the photographing field from before the unit in close-up photographing is equipped fixedly.

15 Claims, 20 Drawing Sheets

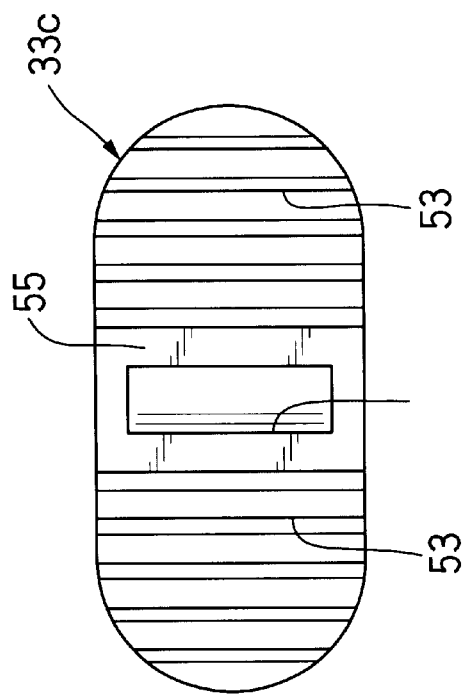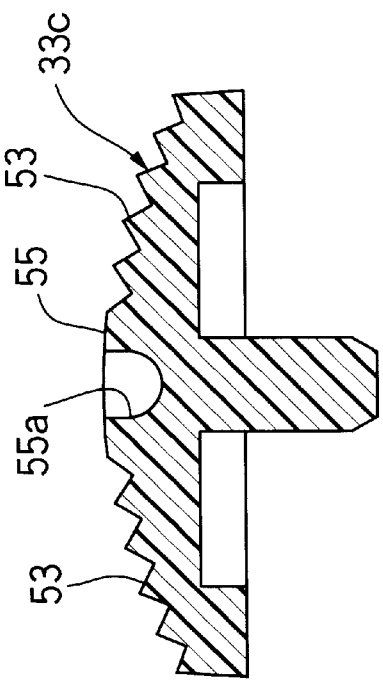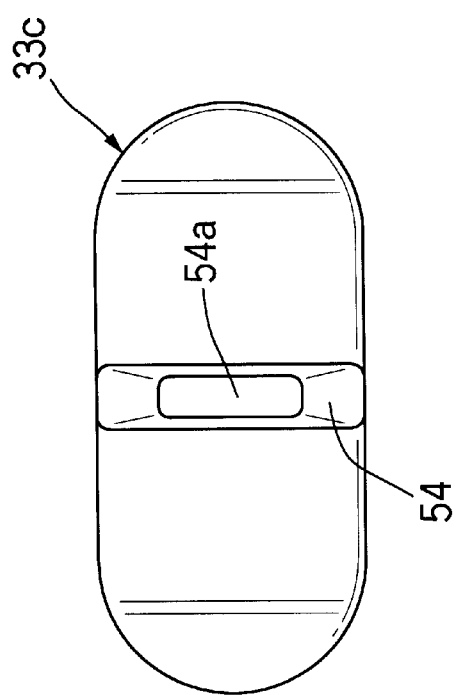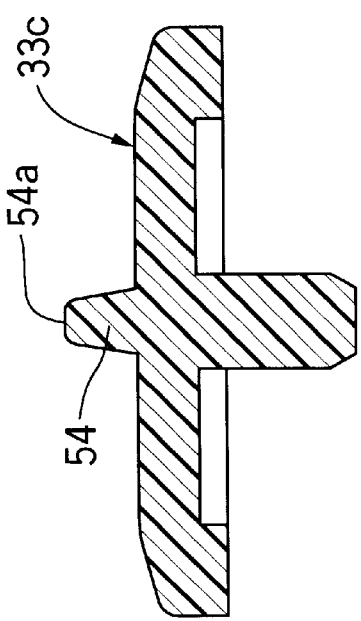

LENS-FITTED FILM UNIT PROVIDED WITH FOCUS ADJUSTING MECHANISM

FIELD OF THE INVENTION

This invention relates to photographing apparatuses such as lens-fitted film units and photo cameras of simple structures. More particularly, this invention relates to a photographing apparatus provided with a focusing position selecting mechanism which allows the photographer to set selectively two or more focusing points of a taking lens when taking a photo. Further more particularly, this invention relates to a finder mechanism which is suitable for application to products of simple structures provided with photographing functions, for example, such as lens-fitted film units and photo cameras of simple structures.

BACKGROUND OF THE INVENTION

A lens-fitted film unit, which includes a photographing mechanism containing a taking lens and a shutter with an unexposed film roll previously loaded in the main body in the process of manufacture, is published, for example, in Japanese registered utility model publication No. 2,564,847. This lens-fitted film unit is so constituted as to wind up the exposed film into the cartridge each time a picture is taken, and so the user buys the unit and takes the unit itself to a photo developing shop to have it developed after the film roll has been finished. Therefore, the unit has gained wide market acceptance as a convenient and functional photographing product.

This lens-fitted film unit generally uses a single lens or two-piece lens structure in order to simplify the structure and bring down the cost of manufacture. This taking lens is fixed to the main body and focused on one particular focusing position. Therefore, the out-of-focus condition must be avoided by making the depth of field of the taking lens greater for objects which are not at the focused distance. However, various kinds of lens-fitted film units have recently been developed in respect to picture sizes and focal lengths of the taking lens, and so multifunctional products are much sought after.

In such diversified lens-fitted film units, it is required to properly set focusing positions in the process of manufacture in case it uses a long-focus taking lens, and so it is necessary to adopt a variety of schemes for the lens-focusing mechanism. For example, in the publication of Japanese laid-open patent publication Hei7-261069, a mechanism furnished with such a focusing mechanism as to focus a taking lens precisely and fix it to the setting position in the process of manufacture of a lens-fitted film unit furnished with a telephotographic lens, is disclosed. However, even in such a lens-fitted film unit, it is not possible to shift the focusing position to a plurality of focusing positions because the lens is fixed to the predetermined position. Taking such situations into consideration, it is preferred that lens-fitted film units and other cameras of simple structures can be applied to a plurality of different photographing situations such as normal photographing, and photographing of distant objects, and that they can take pictures properly focused while using a single taking lens or a two-piece-lens structure. A lens-fitted film unit, which is constituted to be able to take close-up photos in the proximity of within 60 cm with a reflex finder capable of moving in and out to allow the photographer to confirm the field and take photos of himself included in the field, is also suggested in the publication of Japanese laid-open patent publication Hei10-200834. The lens-fitted film unit disclosed in the publication can not be applied to a plurality of situations such as close-up photographing, normal photographing, and photographing of distant objects because the lens-fitted film unit does not have a plurality of focusing positions.

SUMMARY OF THE INVENTION

The present invention have been obtained in consideration of the above mentioned circumstances and has an object to provide a focus adjustment mechanism appropriate for use with a lens-fitted film unit or other simple structured cameras that use such a simple structured taking lens as a single-piece lens or two-piece lens structure, for example, and also adapt to photographing under a plurality of different conditions such as close-up photographing, normal photographing, and photographing of distant objects, and can take appropriately focused pictures in each case.

Another object of the present invention is to provide a lens-fitted film unit equipped with a simple structured lens mechanism that can adapt to photographing under a plurality of different conditions such as close-up photographing, normal photographing, and photographing of distant objects, and also with a finder that enable a photographer to check the photographing field from the front in close-up photographing and take pictures including he/herself in a composition.

In order to solve the above mentioned problem, a lens-fitted film unit in accordance with the present invention comprises a unit body having a photographing mechanism including a shutter, the unit body being formed with a cartridge chamber for storing a cartridge shell having a spool provided therein for rotation and retaining an end of a photo film strip, and a film roll chamber for storing a roll of unexposed photo film strip withdrawn out of the said cartridge shell, a cartridge shell and a roll of an unexposed photo film strip withdrawn out of the cartridge shell being charged in advance during manufacturing in the said cartridge chamber and the said film roll chamber, respectively, whereby an exposed film portion is taken up into the cartridge shell after each shot of photographing by rotating said spool, a selector member being provided for selectively determining a focus adjusting position either at a normal photographing position or at a close-up photographing position. The lens-fitted film unit is provided with a cylindrical lens holding member fixed to the unit body, a lens holding frame, in which a taking lens is fixed, arranged in the cylindrical lens holding member for rotation and axial movement in the direction of an optical axis, and a cam mechanism provided between the cylindrical lens holding member and the lens holding frame, the selector member being disposed in the camera body for movement between a predetermined normal photographing position and a close-up photographing position, the movement of the selector member causing the lens holding frame to rotate to thereby cause the lens holding frame to move along the optical axis by the action of the cam mechanism. The cam mechanism is provided with a cam member fixed to the cylindrical lens holding member and extending in the direction of the optical axis, the cam member being formed at a front end with a cam surface. On the back side of the lens holding frame, there are formed engaging legs that project backward along the optical axis and engage with the cam surface of the cam member. To depress the lens holding frame elastically onto the cam member, a spring is provided. The spring is located between an outer cover of the unit body and the lens holding frame. In a preferable structure, the spring is in the form of a coil spring, and the outer cover is formed around a photographing opening with a cylindrical spring support to be fitted into an end of the coiled spring. It is a preferable that the coil support has a diameter which is a little larger than the inner diameter of the coiled spring, so that the coiled spring is expanded radially to fit around the spring support. In this fashion, it will become possible that an end of the spring is engaged with the spring support elastically, and the spring is temporarily held on the outer cover, and transferred to an assembly site.

Engagement between the lens holding frame and the selector member is made by a pair of lens driving pins projecting backward from the selector member and a driven pin formed on the lens holding frame to project radially outward. The lens driving pins on the selector member are located with a space along the direction of movement of the selector member, while the driven pin on the lens holding frame occupies a position between the pair of the lens driving pins, and the selector member is driven by one of the pair of the driving pins when the selector member moves in one direction, while it is driven by the other pin when it moves in the other direction. The distance of the movement of the pair of the driving pins in the direction of the movement of the selector member is preferably 2 to 5 times as large as the diameter of the driven pins, so that, when the said selector member moves in one direction, by having one of the lens driving pins engaged with the driven pin, there is maintained between the driven pin and the said other lens driving pins a certain space corresponding to the difference of the distance between the pair of driving pins and the diameter of the driven pin. When the selector member moves in the opposite direction, the said other lens driving pin engages with the driven pin to drive the driven pin in the direction opposite to the said direction after the selector member has moved a distance corresponding to the space. More specifically, in each stroke of the movement of the selector member, after the selector member has made a predetermined distance of lost motion, either of the pair of lens driving pins on the selector member engages with the driven pin.

During assembly, the selector member is placed at one terminal end of the stroke of the movement. The lens holding frame is located at a position where the driven pin either engages with the lens driving pin located backside in terms of the direction of movement of the selector member in a succeeding stroke, or spaced apart for a distance from the lens driving pin smaller than the predetermined distance for the above mentioned lost motion. At this position of the cylindrical lens holding member, there is provided a retaining member for holding the driven pin on the lens holding frame to prevent the lens holding frame from dropping off from the cylindrical lens holding member. With the structure described above, the cylindrical lens holding member and the lens holding frame temporarily held thereon can be transferred to an assembly site in assembly. After assembly, when the selector member is first moved, the driven pin of the lens holding frame is disengaged from the retaining member, so that the selector member can be driven until it reaches the opposite terminal end of the movement stroke. When the selector member is thereafter moved in the opposite direction, after the selector member has moved by the distance of above mentioned lost motion, the other lens driving pin engages with the driven pin, and the selector member is driven until it reaches the first terminal end of the movement stroke. The position where the driven pin stops is different from that where the driven pin was held during assembling, so that when the selector member moves for a succeeding stroke, the driving pin engage the driven pin after the selector member has moved the predetermined distance for the lost motion. Therefore, after assembly, the driven pin is driven by a pair of driving pins without engaging the retaining member.

A selector member is located on the back side of the outer cover. The selector member is urged in one direction of movement by an elastic spring. On the selector member, a selector knob is formed, and the selector knob projects through a slot formed on the outer cover, and enables operation by fingers. In one specific form of the embodiment of the present invention, the front side of the selector knob is of such a configuration that it projects forwardly more than any other parts of the unit and contacts the packaging material most strongly. In this form of embodiment of the present invention, there is provided a flat area of a predetermined width on the top of the front side of the selector knob to increase the contact area with packaging material, to thereby prevent the knob from being worn out under vibrations during transportation. The width of the flat area is preferably 0.5 mm or more. In this flat, a recess of any desired shape can be formed, the recess having an effect of preventing shrinkage distortion of material in casting when selector knobs are formed with plastic material.

In accordance with features of the present invention, a lens-fitted film unit is further provided with a photographing field finder, and a reflexive mirror which is fixedly provided at a side of the photographing field finder to make it possible to observe a photographing field from the front side of the unit in close-up photographing. In the lens-fitted film unit according to the present invention, the focus position of the taking lens can be selected arbitrary, by moving the selector member between a 4 m focus position and a 60 cm focus position, for example. Also in another form, any one of 3 positions, for example, an infinite focus position, a 60 cm focus position can be selected arbitrary.

Moreover, in case of the 60 cm focus position for the close-up photographing is selected, a photographer can observe the photographing field by the reflexive mirror from the front side of the unit, and take pictures including the photographer himself in the photographing field.

In another form of the present invention, the selector member is formed integrally with a close-up field frame which is adapted to be located over the photographing filed finder to indicate the area of close-up photographing to compensate the parallax between the field of taking lens and the finder field when the selector member is at the close-up photographing position. This close-up field frame may be provided with a target mark that indicate the center of the photographing area when the selector member is at the close-up photographing position. Also, in the lens-fitted film unit of the present invention, a strobe flashing bulb is arranged in front of the unit body, and the selector member can be formed integrally with a light limiting portion that covers at least a part of the front side of the strobe flashing bulb to limit or restrict light emitted from the flashing unit.

According to another aspect of the present invention, there is provided a focus adjusting mechanism of a taking lens which comprises a cylindrical lens holding member fixed to a camera body and formed with a plurality of cam surfaces at circumferentially spaced places in a front side surface, and a lens holding frame provided in the cylindrical lens holding member for rotation and an axial movement in the direction of an optical axis and provided on outer peripheral portions with one or more pins which are adapted to be slidably engaged with said cam surfaces in the cylindrical lens holding member. The taking lens is fixed in the lens holding frame. The camera body has a lens holding frame holder of elastic material fixed thereto for holding the pins on the lens holding frame between the cam surfaces of the cylindrical lens holding member and the lens holding frame holder. A selector member is provided along the front side of the camera body for a sideward movement, the movement of the selector member causing the selector member to engage with the pins on the lens holding frame to thereby rotate the lens holding frame. As a result, the lens holding frame is caused to move in the direction of the optical axis by the engagement of the pins with the cam surfaces.

By using the focus adjusting mechanism of the taking lens according to the present invention, the focus position of a taking lens can be selected arbitrarily, for example, at either a 4 m position or a 60 cm position. In another form, selection at either an infinite focus position and a 4 m focus position may be possible, and if a cam surface is constructed with three steps, three arbitrarily selectable focus positions including, for example, an infinite focus position, a 4 m focus position, and a 60 cm focus position can be selected.

In another form of the present invention, a cylindrical lens holding member fixed to the camera body is formed with circumferentially spaced cams which are formed to penetrate from an inner circumference to an outer circumference of the lens holding member and have forwardly directed faces providing cam surfaces. The cam may be, for example, in the form of cam grooves. On the outer circumference of the lens holding frame, there are provided pins adapted to engage with the cams on the cylindrical lens holding member. The pins are inserted into the part where the cams are formed and project out of the outer surface of the cylindrical lens holding member. A selector member is arranged on the front side of the camera body so as to be movable sidewardly, the sideward movement causing the selector member to engage the pins on the lens holding frame to thereby rotate the lens holding frame. The engagement of the pins with the cam surfaces causes the lens holding frame to move in the direction of the optical axis. The selector member may be in the form of a frame member provided with an elongated opening in the middle portion, and in this case, the lens holding frame may be arranged to protrude from the opening of the frame member. The frame member is provided on the back side with lens holding frame driving pins protruding backward, and the lens holding frame driving pins engage with the pins on the lens holding frame and rotate the lens holding frame.

Also, the present invention provide a lens-fitted film unit equipped with a focus adjusting mechanism of taking lens above mentioned. Alternatively, the present invention provides, in one mode, a lens-fitted film unit, including a taking lens held in front of the unit body, a photographing mechanism having a shutter and provided in the body, the unit body having a cartridge chamber for storing a cartridge shell having a rotatable spool retaining an end of a photofilm strip, and a film roll chamber for storing a roll of unexposed photo-film withdrawn out of the cartridge shell, a cartridge shell and a roll of unexposed photo-film withdrawn out of the cartridge shell being charged during manufacture in the cartridge chamber and the film roll chamber respectively in advance, the spool being rotated to take up a frame of exposed film into the cartridge shell each time a shot is taken, said lens-fitted film unit being provided with the above mentioned taking lens focus adjustment mechanism. In this case, the unit body has a cylindrical lens holding member fixed thereto the cylindrical lens holding member being provided circumferentially spaced positions with cams which are formed by forwardly facing surfaces of positions penetrating from an inner circumference to an outer circumference. The taking lens is fixed to the lens holding frame, and the lens holding frame is arranged in such a way that it can rotate or move in the direction of the optical axis. The lens holding frame is provided with a pin on the circumference thereof, and the pin engages with the cam of the cylindrical lens holding member and projects out of the cylindrical lens holding member. In front of the camera body the selector member is arranged so as to be able to move sidewardly, and the sideward movement of the selector member causes the selector member to engage with the pin on the lens holding frame to thereby rotate the lens holding frame, the engagement of the pin with the cam causing surface causing the lens holding frame to move in the direction of the optical axis. The selector member may be in the form of a frame member having an elongated opening in the middle portion, and is arranged in such a way that from the opening of the frame member the lens holding frame projects out. In backside of the frame member, there are provided lens holding frame driving pins for engagement with the part of the pin on the lens holding frame that projecting out of the cylindrical lens holding member, to rotate the lens holding frame. In front of the unit body, a covering member may be attached so as to cover the frame member constituting the selector member.

BRIEF DESCRIPTION OF DRAWINGS

FIG. 17 illustrates an example of a selector knob having a friction prevention effect, (a) being a top view of the first example, (b) a cross-sectional view whereof, and (c) being a top view of the second example, (d) a cross-sectional view whereof.

DESCRIPTION OF PREFERRED EMBODIMENTS

Figure 1:
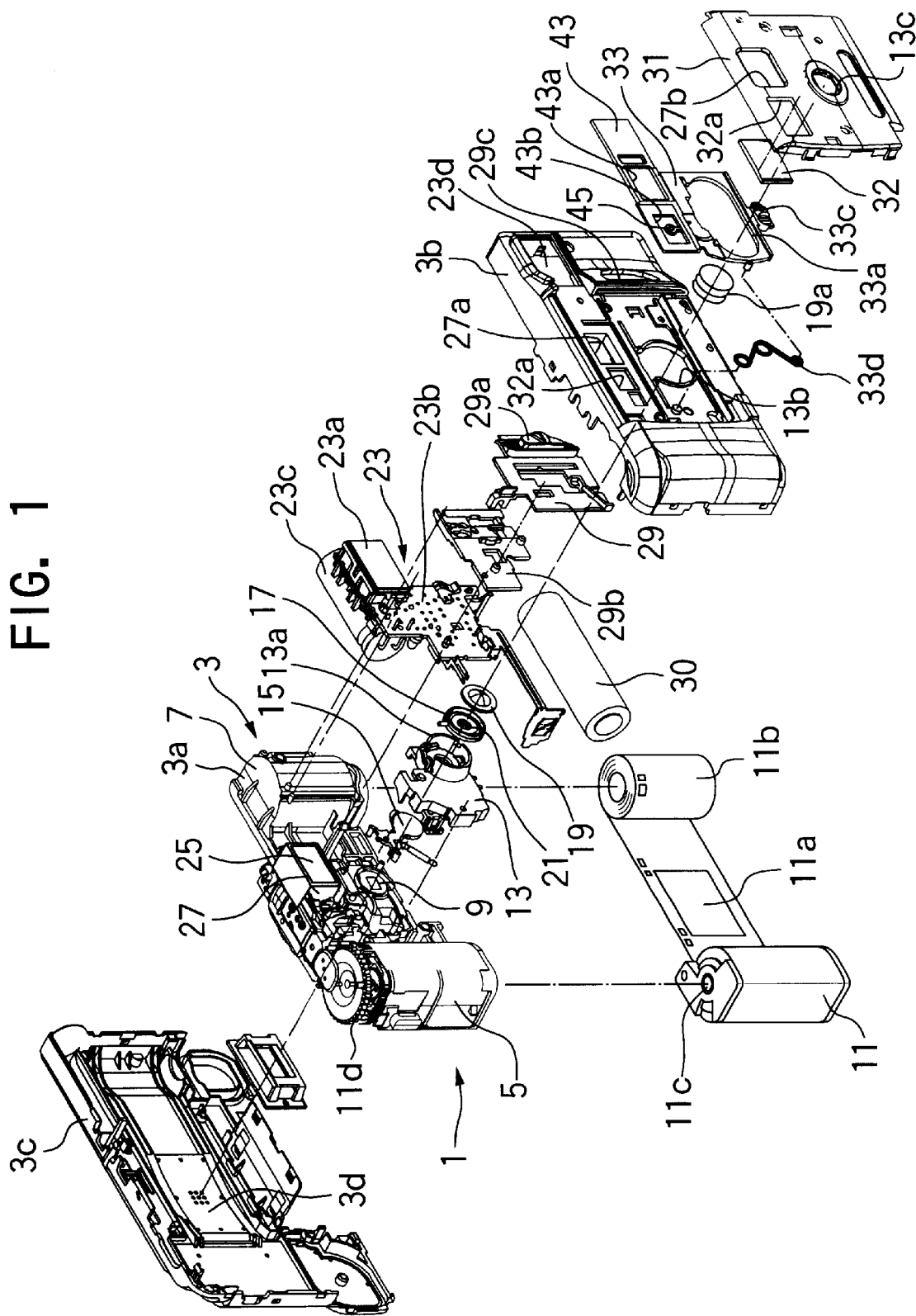
FIG. 1 is an exploded perspective view illustrating a lens-fitted film unit in it's entirety embodying the present invention.
Figure 2:
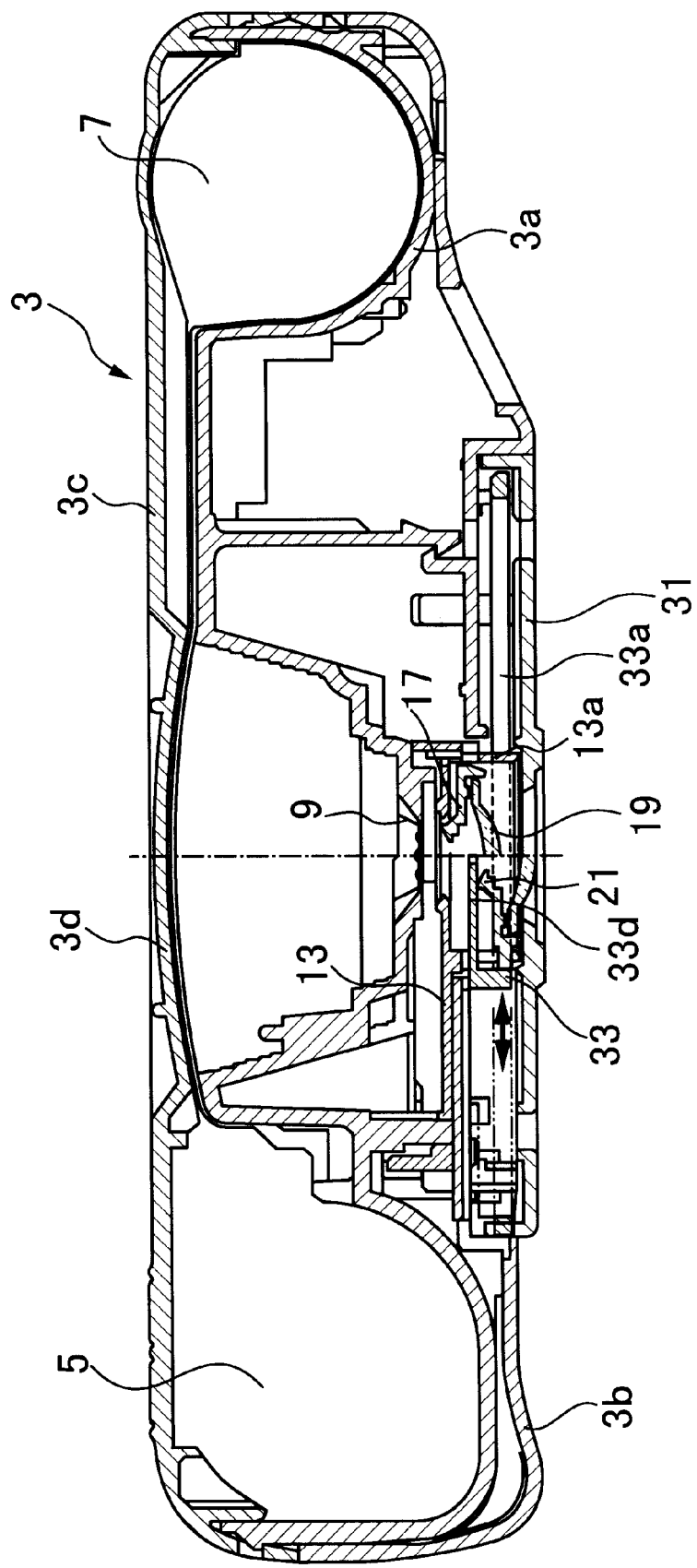
FIG. 2 is a horizontal sectional view of the lens-fitted film unit illustrated in FIG. 1.

FIG. 1 is an exploded perspective view of a lens-fitted film unit, showing an example of the present invention embodied. A lens-fitted film unit 1 is provided with unit body 3 comprising basic portion 3a, front cover 3b, and rear cover 3c. As shown in FIG. 2, in a space between the basic portion 3a and the rear cover 3c, a cartridge chamber 5 and film roll chamber 7 are formed in each end respectively. In the middle of the basic portion 3a an exposure aperture 9 is formed. During the manufacturing process of the lens-fitted film unit 1, a roll of photo film in a cartridge shell 11 is prepared, unexposed film 11a is withdrawn out, and a film roll 11b is formed. An end on the cartridge side of the unexposed film 11a is fixed on the spool 11c installed in the cartridge shell 11 to rotate freely.

The cartridge shell 11 is stored in the cartridge chamber 5 and the film roll 11b in the film roll chamber 7. Thereafter the rear cover 3c is attached to the back side of the basic portion 3a, and fixed light-tightly. Another form of embodiment that the film roll chamber 7 is provided with a reel (not shown), a cartridge shell 11 is charged in the cartridge chamber 5, and then the leader of the unexposed film 11 is attached to the reel, the rear cover 3c is closed, and the reel is driven to rotate after assembly of the unit body 3, unexposed film 11a is withdrawn out of the cartridge shell 11 and wound up into a roll sequentially will also possible. Inside the rear cover 3c, at a position corresponding to the back of the exposure aperture, a film holder 3d is prepared, and the unexposed film 11a between the cartridge shell 11 and film roll 11b is held between the film holder 3d and the film support 3e formed in the backside of basic portion 3a.

In front of the basic portion 3a, a lens holder 13 provided with a cylindrical lens holding member 13a is fixed. The cylindrical lens holding member 13a is axially aligned with the exposure aperture 9 formed on the basic portion 3a. Between the lens holder 13 and the basic portion 3a, a sector blade 15 constituting a shutter apparatus is located. The shutter apparatus containing the sector blade 15 is charged by the operation of taking up the unexposed film 11a, and released by depressing the release button provided on the upper side of the unit body 3. The shutter apparatus and the operation mechanism whereof is well known in the field of lens-fitted film unit, a detailed description is neglected. In order to take up the film into the cartridge shell 11, a film taking-up knob 11d is provided so as to rotate freely above the cartridge chamber 5 on the upper side of basic portion 3a, and the film taking-up knob 11 is connected to the spool 11c of the cartridge shell 11.

The cylindrical lens holding member 13a is cylindrical, and formed integrally with the lens holder 13 with plastic material. In the cylindrical lens holding member 13a a lens holding frame is located, to rotate freely and move axially freely. To the lens holding frame, a taking lens 19 is fixed. The taking lens 19 is a single-piece lens or a two-piece lens structure of a invariable focus distance. In the lens holding frame 17 in back of the taking lens 19 the first fixed aperture 21 is prepared. In the present example, the taking lens 19 is a standard lens the focal distance of which corresponds to about 30 mm reduced into 135 film, and the first fixed aperture 21 has the f-number of nearly F10 for standard photographing.

The lens-fitted film unit 1 in the embodiment illustrated is of built-in flash unit type. The flash unit 23 is provided with a light emitting portion 23a, a printed circuit board 23b containing a control circuit to control the flashing from the light emitting portion 23a, and a main capacitor 23c. The light emitting portion 23a and main capacitor 23c are supported on the printed circuit board 23b. Above the exposure aperture 9 in the basic portion 3a, a finder window 27 wherein a finder objective lens is adapted is formed, and the printed circuit board 23b is fixed on the basic portion 3a in such a way that, the light emitting portion 23a places in the right side of the finder window 27 in a front view of the basic portion 3a.

Figure 3:
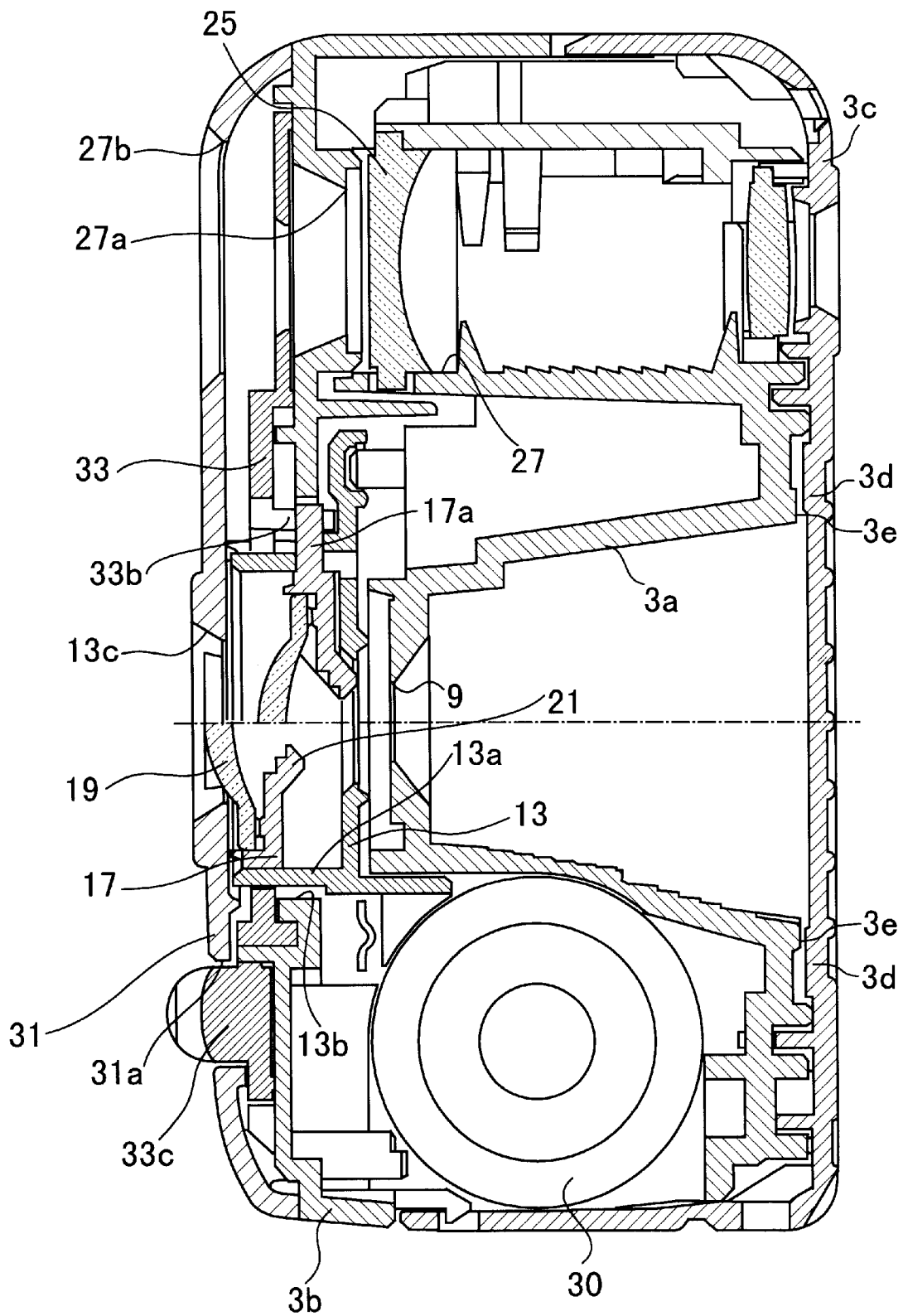
FIG. 3 is a vertical sectional view of the lens-fitted film unit illustrated in FIG.1.

In front of the printed circuit board 23b on the flash unit 23 a switch board 29 is located. The switch board 29 is located on the printed circuit board 23b with a support board 29b disposed therebetween. The switch board 29 is able to move up and down sliding, wherewith a switch knob 29a is formed integrally, and by setting the switch knob 29a to the charging position, the main capacitor 23c of the flash unit 23 is charged. The capacitor charging battery 30 is stored, as shown in FIG. 3, in the bottom of the basic portion 3 as it is well known in the field of lens-fitted film unit.

On the front side of basic portion 3a, a front cover 3b is fixed. The front cover 3b is so formed as to cover almost all the front side of the basic portion 3a, and comprises a finder window 27a aligning with the finder window 27 of the basic portion 3a, a flash window 23d for exposing the light emitting portion 23a forward, a strobe switch opening 29c for exposing the switch knob 29a on the switch board 29 within the stroke range whereof in the front side of the basic portion 3, and the lens opening 13b for the a cylindrical lens holding member 13a of lens holder 13 to pass through. As shown in FIG. 2 and FIG. 3, the cylindrical lens holding member 13a extends forward through the lens opening 13b in the front cover 3b.

Figure 4:
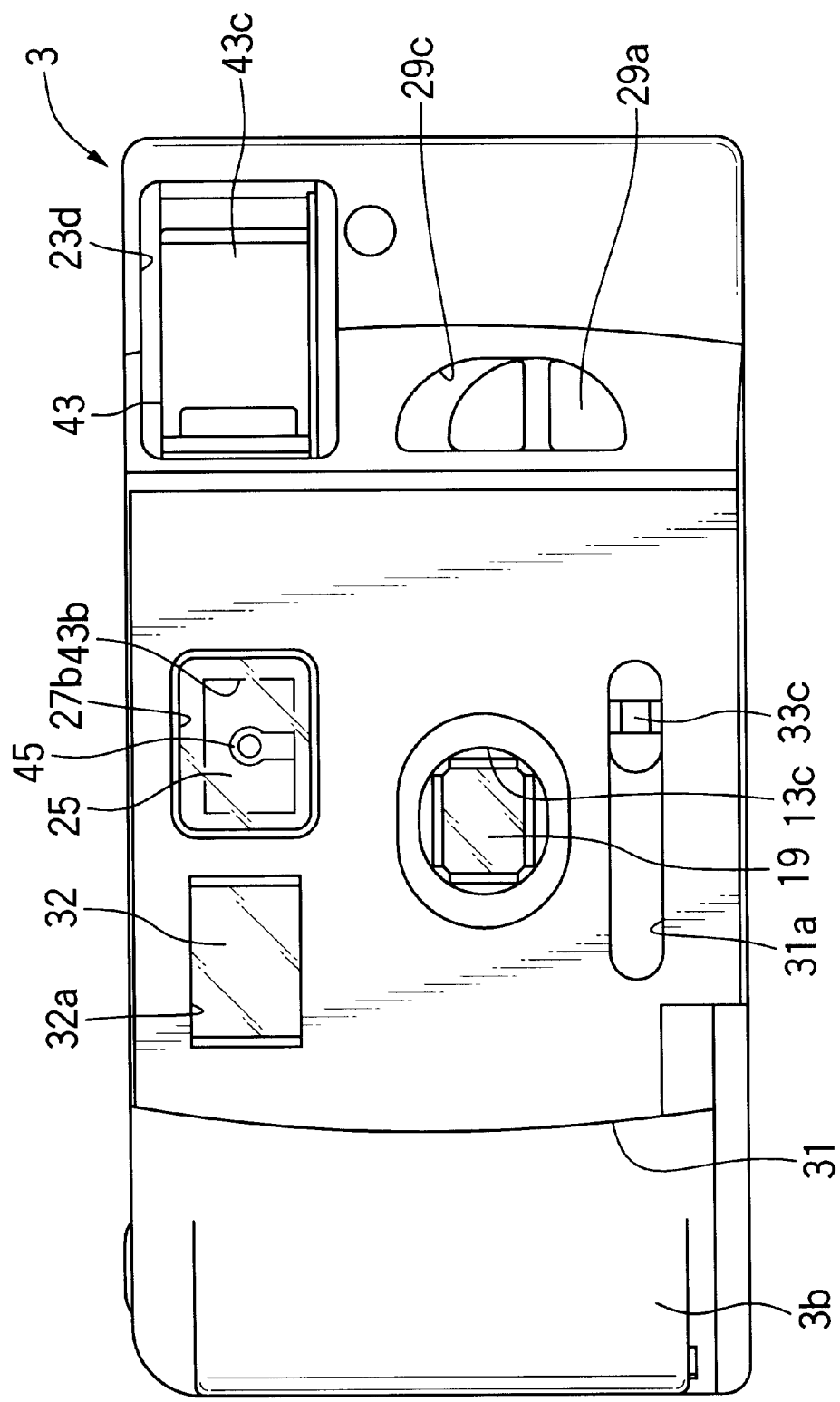
FIG. 4 is a front view of the lens-fitted film unit illustrated in FIG. 1 under a close-up photographing condition.

On the front of the front cover 3b, an outer cover 31 is fixed. In the outer cover 31, a finder window 27b is formed so as to align with the finder window 27a in the front cover 3b, and a reflective mirror 32 is located alongside of the finder window 27a to make a reflecting finder for seeing the photographing range from the front side in close-up photographing. In the embodiment illustrated, the reflective mirror 32 is formed with a piece of lustrous metal plate. A window 32a is formed aligned with the reflective mirror 32 so as to expose the reflective mirror 32 forward. Also in front of the cylindrical lens holding member 13a, a photographing exposure aperture 13c is provided to pass photographing light. Between the outer cover 31 and lens holding frame 17, a coiled spring 19a is located. This coiled spring 19a, a first end whereof being engaged with the lens holding frame 17, the other end with the inside of the outer cover 31 respectively, push the lens holding frame elastically toward the cylindrical lens holding member 13a. Between the outer cover 31 and the front cover 3b is located a selector member 33 movable sideways. FIG. 4 is an exterior front view of the lens-fitted film unit 1 according to the embodiment. As shown in FIG. 4, a reflective mirror 32 is located in the left side of the finder window 27 for the subject looking at the lens-fitted film unit 1, or in the right side for the lens-fitted film unit 1 facing the subject.

Figure 5:
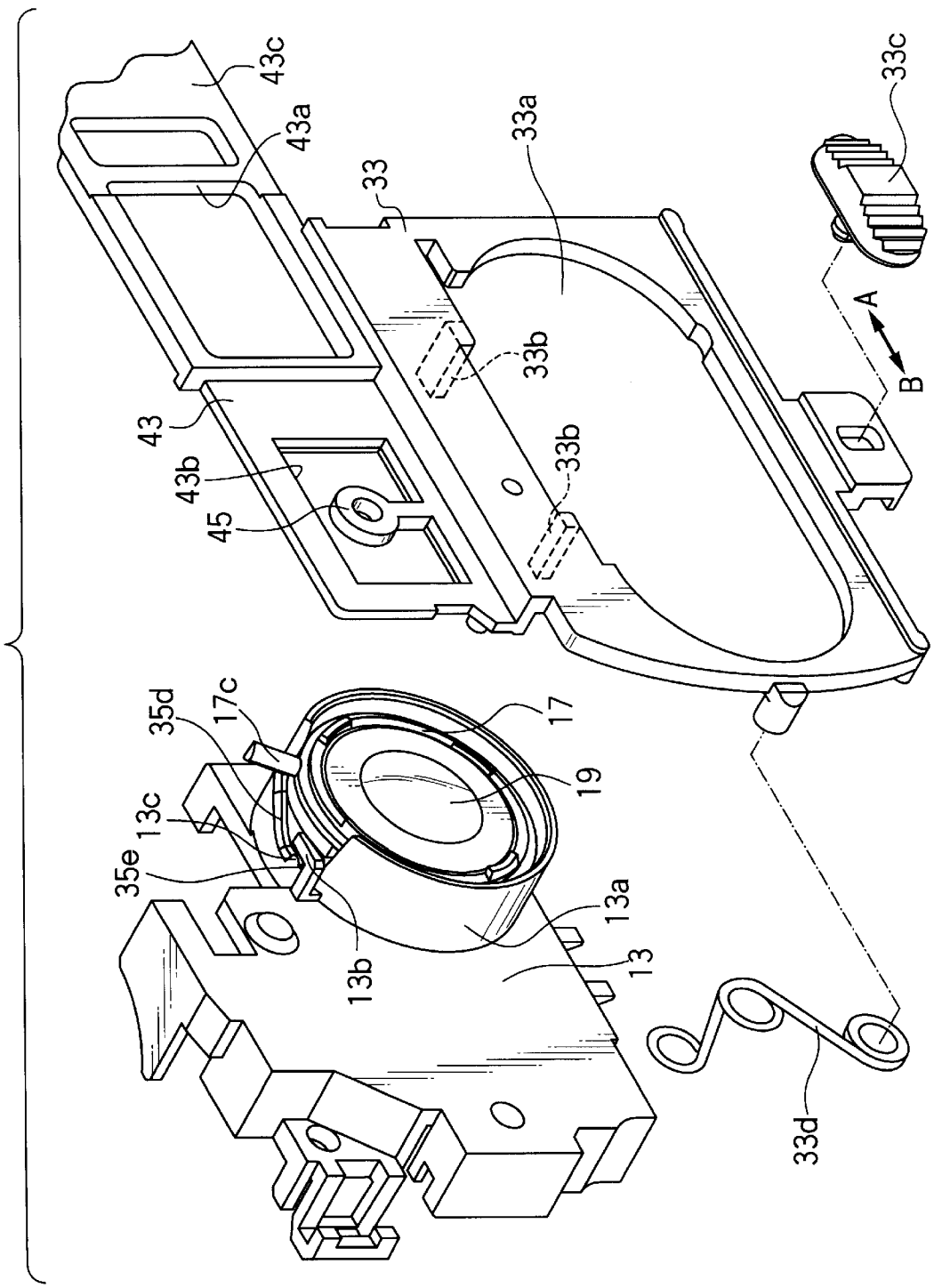
FIG. 5 is an exploded perspective view illustrating an arrangement of a selector member in a focus adjusting mechanism of the taking lens in one embodiment of the present invention.
Figure 6:
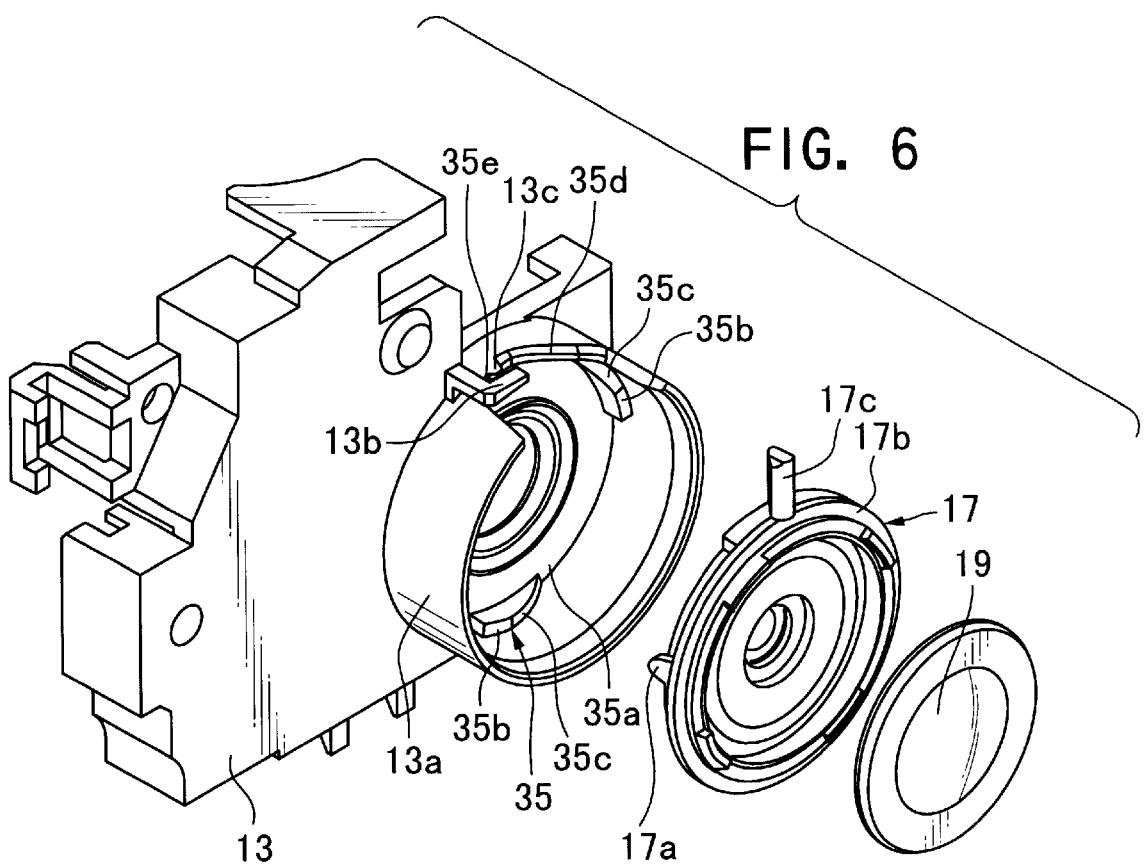
FIG. 6 is an exploded perspective view illustrating the focus adjusting mechanism of the taking lens in one embodiment of the present invention.

FIG. 5 and FIG. 6 illustrate the details of the focus adjusting mechanism of the taking lens embodied by the present invention. The cylindrical lens holding member 13a extending from the lens holder 13 has a cam surface 35 facing the object. In the embodiment illustrated, the cam surface 35 is composed of the first surfaces 35a to define the recessed position of the taking lens 19, the second surface 35b to define the projected position of the taking lens 19, and the slopes 35c to connect the first surfaces 35a and the second surfaces 35b. The cam surface 35 is formed at a plurality of (for example 3) equi-spaced positions on the circumference of the cylindrical lens holding member 13a.

Figure 7:
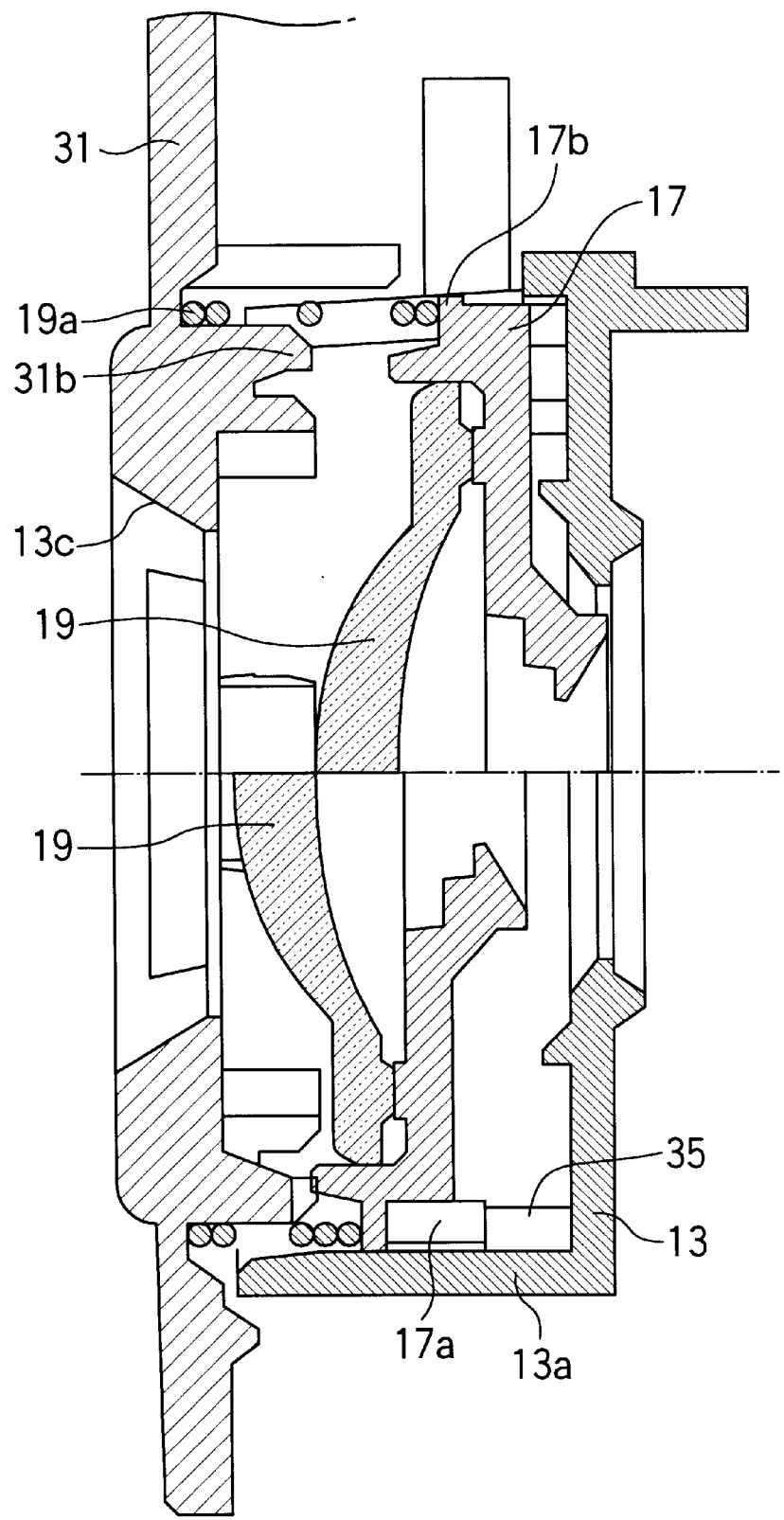
FIG. 7 is an enlarged sectional view of a supporting mechanism of the taking lens in one embodiment of the present invention.
Figure 8:
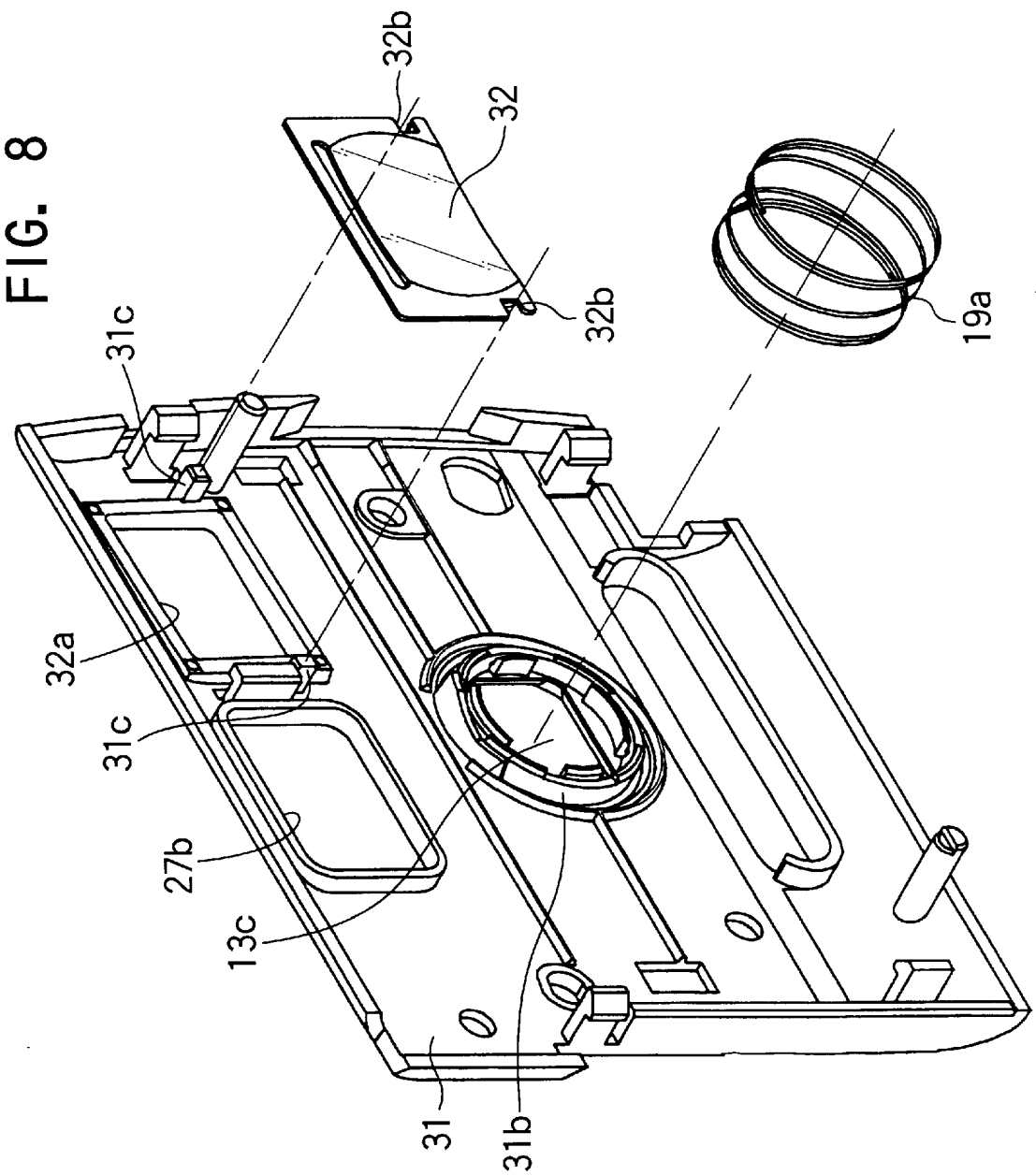
FIG. 8 is a perspective view looking at a front cover from behind to illustrate the attaching structure of a coiled spring for holding down the lens.

The lens holding frame 17 is so formed as to have a plurality of (for example 3) cam driven legs 17a projecting axially backwards. The cam driven legs 17a engage with cam surfaces 35 of a cylindrical lens holding member 13a. The lens holding frame 17 is equipped with a flat circular platform 17b on the front circumference, and on the circular platform 17b the backward end of the coiled spring 19a sits. The cam driven legs 17a of the lens holding frame 17 are depressed onto the cam surfaces 35 of the cylindrical lens holding member 13a elastically by the coiled spring 19a. FIG. 7 and FIG. 8 illustrate an attachment construction of the coiled spring 19a. The outer cover 31 is equipped with a substantially cylindrical spring support 31b surrounding photographing exposure aperture 13c and protruding backward from the back side, and the front end of the coiled spring 19a attaches around the spring support 31b. The outside diameter of the spring support 31b is a little larger than the inside diameter of an end of the coiled spring 19a. Therefore the coiled spring 19a is, the end whereof is radially extended, attached around the spring support 31b. By the constitution like this the coiled spring 19a can temporarily be held on the outer cover 31 during assembly. The characteristics of this temporal hold bring about a merit to facilitate hold of parts during assembly. FIG. 8 illustrates also the way the reflective mirror 32 is attached to the outer cover 31. In the both sides of reflective mirror 32 formed in the outer cover 31, a pair of attaching pins are provided, and in the circumference of the both sides of the reflective mirror 32 a pair of cut channels matching the pins are formed. The reflective mirror 32 is attached to the outer cover 31 by engaging the cut channels 32b of the reflective mirror 32 with the attaching pins 31c.

Figure 9:
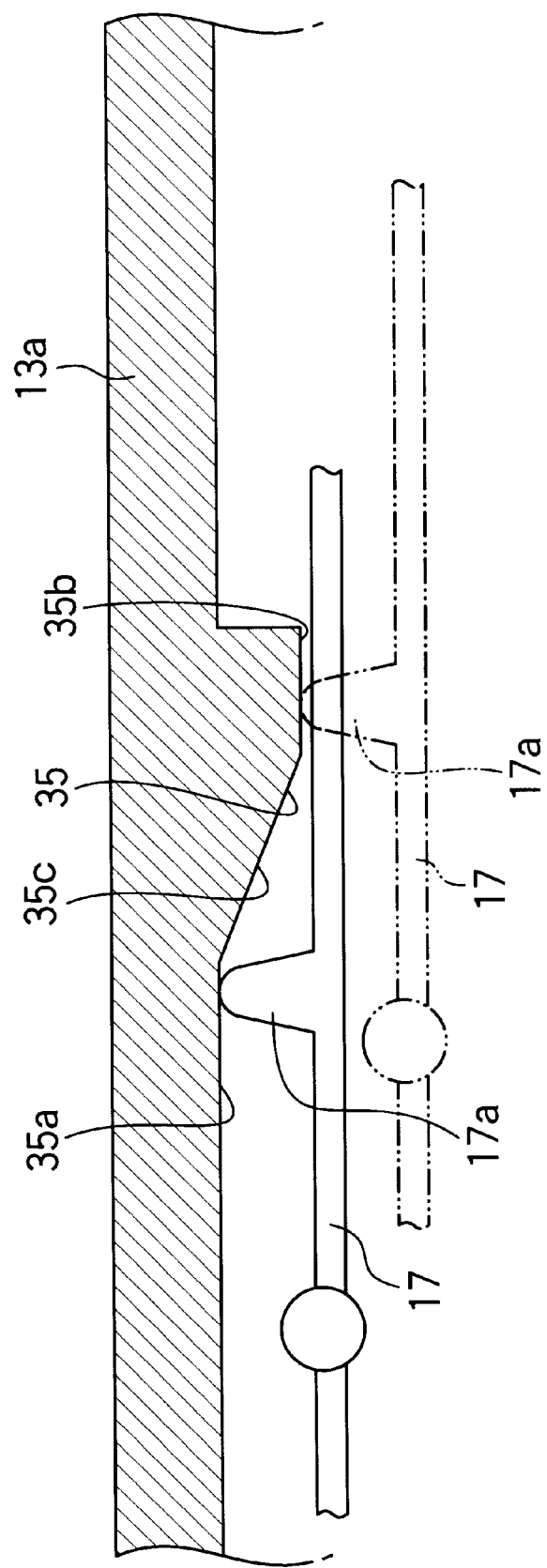
FIG. 9 is a development to illustrate a cam mechanism in the focus adjusting mechanism of the taking lens.

As shown in FIG. 5, the selector member 33 is formed as a frame member provided with an oblong opening 33a in the middle. The selector member 33 is located between the outer cover 31 and the front cover 3b in such a way that the cylindrical lens holding member 13a is inserted into the opening 33a. The lens holding frame is provided with a driven pin 17c protruding upward radially. The selector member 33 is provided with a pair of lens driving pins 33b protruding backward, and between the lens driving pins 33b the driven pin 17c on the lens holding frame 17 is located. In the lower portion of the selector member 33 a selector knob 33c is formed to project out of the slit 31a formed on the outer cover 31. Therefore, the selector member 33 can be transferred sideward by operating the selector knob 33c. The selector member 33 gains strength to move in one direction by the aid of a spring 33d located between the selector member 33 and the front cover 3b of the front cover 3. By the operation of selector knob 33c, the selector member 33 is transferred sideward against the action of the spring 33d. If the selector member 33 moves sideward, the lens driving pins 33b on the selector member 33 engage with the driven pin 17c on the lens holding frame 17 to rotate the lens holding frame 17. By the rotation of the lens holding frame, the cam driven legs 17a slide on the cam surface 35 to receive the action of the cam, and the lens holding frame 17 moves axially. This action of the cam is shown in a development FIG. 9.

When the selector member 33 is set on the right side facing the object, the cam driven legs 17a engage with the first cam surfaces 35a of the cam surface 35, and when the cam driven legs 17a are so positioned, the lens holding frame 17 and taking lens 19 are located in the recessed position, thus the taking lens 19 is in the normal position adjusted to focus on a distant position, for example 4 meters. On the contrary, when the selector member 33 is set on the left facing the object, and the cam driven legs 17a are on the second cam surfaces 35b of the cam surface 35, the lens holding frame 17 and taking lens 19 are advanced to the front position, thus the taking lens 19 is in the close-up photographing position adjusted to focus on a close position, for example 60 cm.

The pair of lens driving pins 33b formed on the selector member 33 are located at a predetermined distance along the direction of the movement of the selector member 33. The distance between the lens driving pins 33b is so designed as to be larger than the diameter of the driven pin 17c on the lens holding frame 17. When the selector member 33 is moved, for the object facing the unit, to the right, or to the arrow A in FIG. 5, the driven pin 17c is moved, by the left pin of the lens driving pin 33b facing the unit, from right to left facing the object. When the selector member 33 reaches the right end of the stroke facing the unit, the right one of the lens driving pins 33b facing the unit is located at a position apart from the driven pin 17c by the predetermined distance matching the distance between the pair of lens driving pins 33b. The relation between the lens driving pins 33b and the driven pin 17c is shown by solid line in FIG. 10.

When the selector member 33 moves in the opposite direction in the next place, the pin on the left side of the lens driving pins 33b facing the unit does not contact the driven pin 17c until the selector member 33 has moved to the left by the predetermined distance above mentioned. This section of stroke will be the unloaded section for the selector member 33 in starting.

Figure 10:
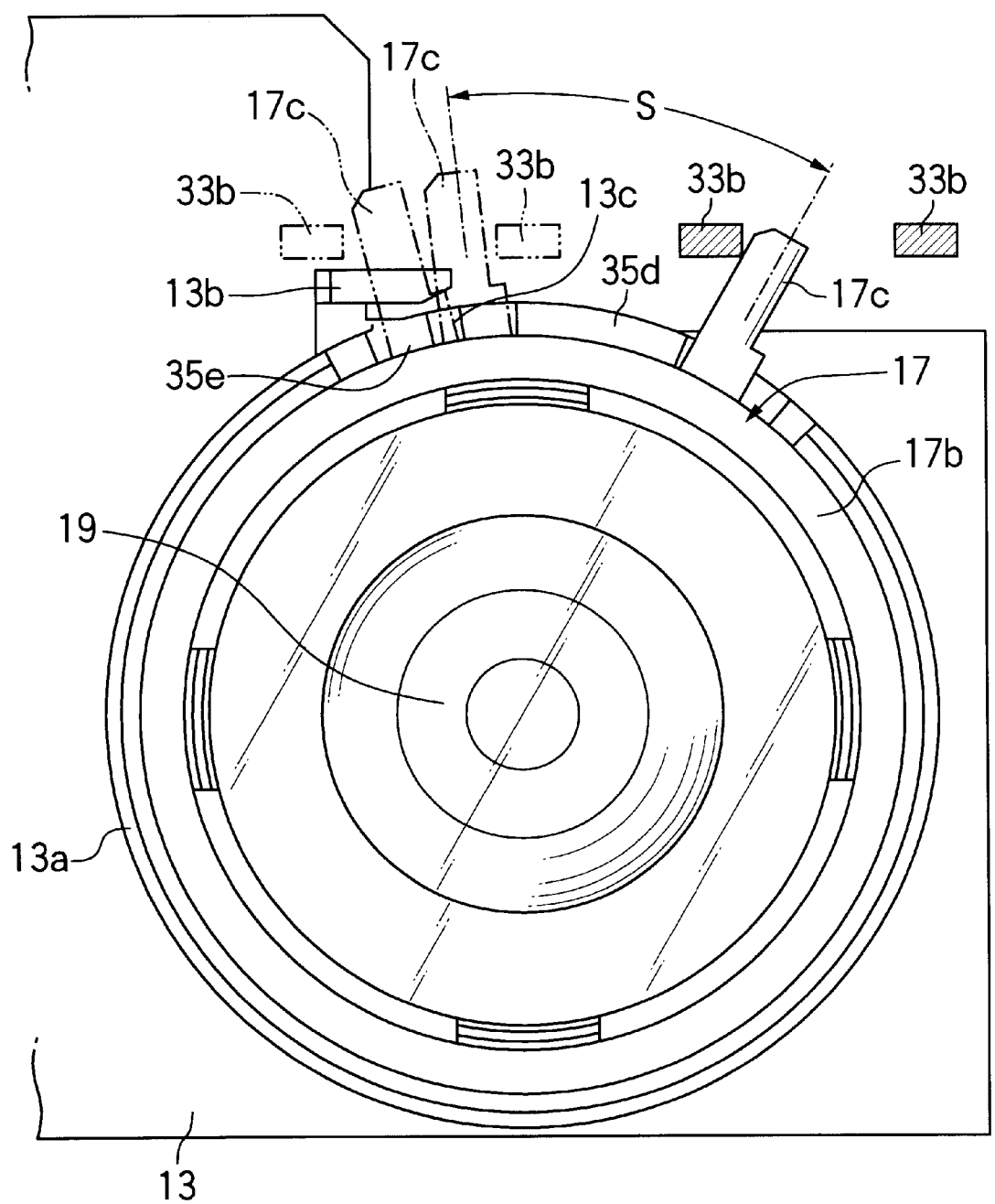
FIG. 10 is a front view illustrating the focus adjusting mechanism of the taking lens of one embodiment of the present invention.

After the selector member 33 has finished the section, the right side one of the lens driving pins 33b engages with the driven pin 17c and drives the pin leftwards to the terminal of the stroke of the selector member 33. The geometrical relation between the selector member 33 and the driven pin 17c is shown in FIG. 10 with dash and dotted line. As shown in FIG. 10, the stroke S of the driven pin 17c is smaller than that of the selector member 33 by the length corresponding to the space between the pair of lens driving pins 33b.

Figure 11:
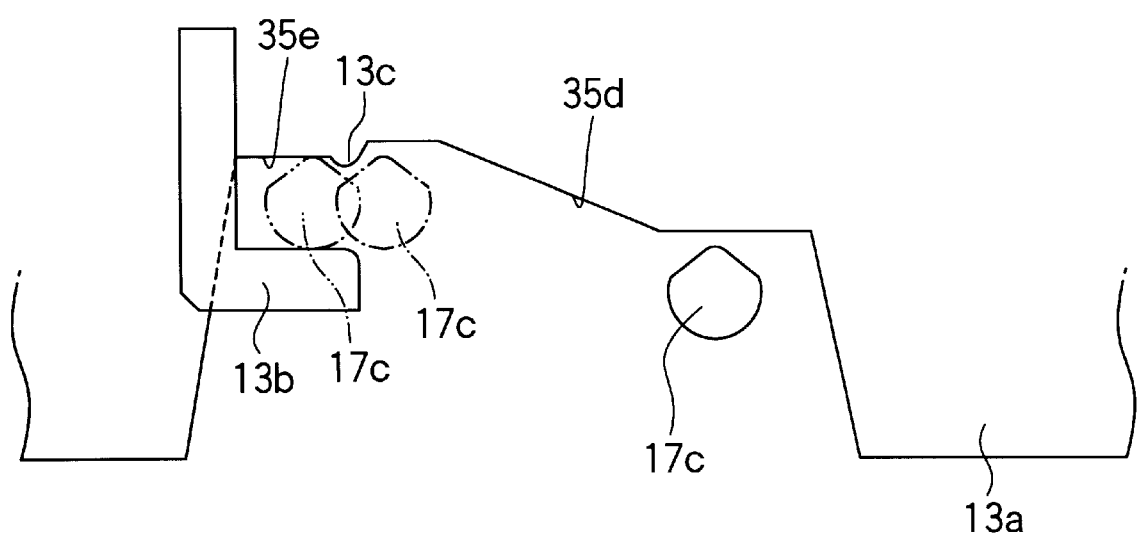
FIG. 11 is a schematic diagram illustrating movement of driven pins in the focus adjusting mechanism of the taking lens in one embodiment of the present invention.
Figure 12:
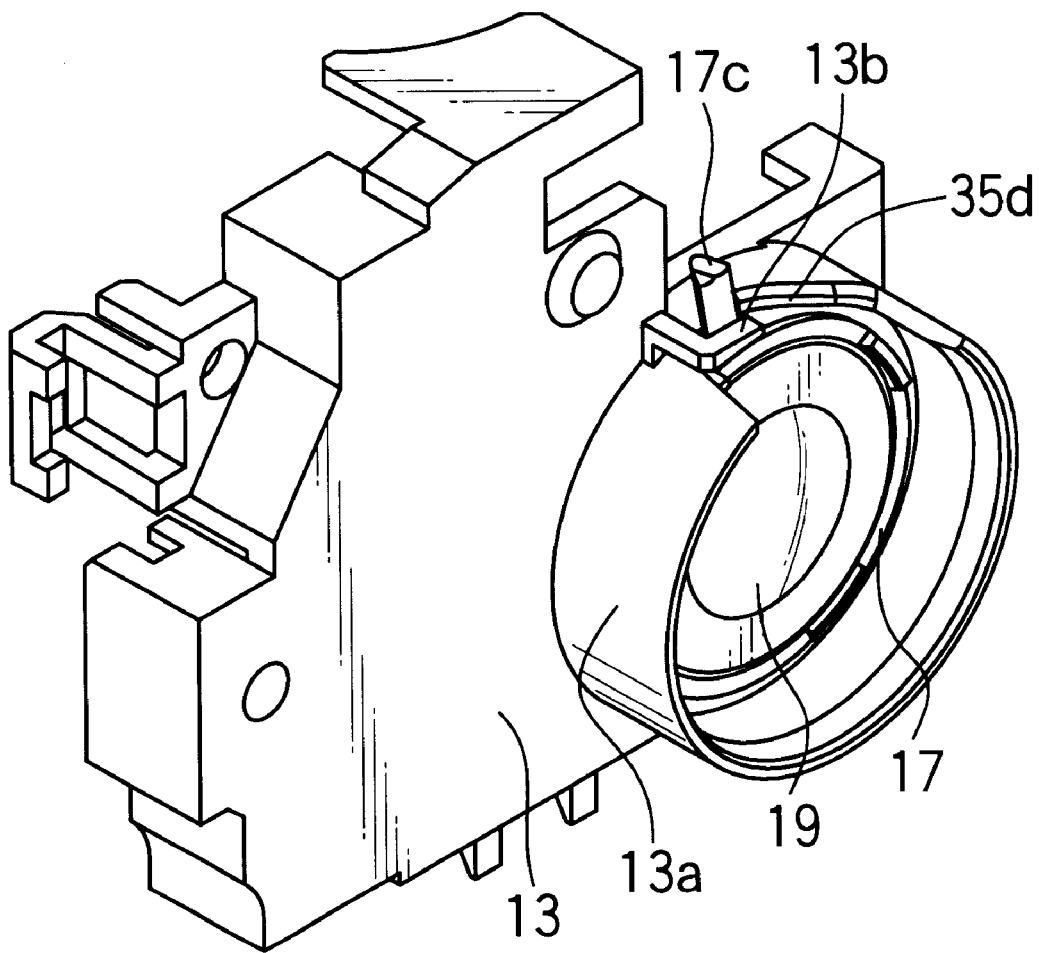
FIG. 12 is a perspective view illustrating a state of the focus adjusting mechanism of the taking lens in assembly.

In assembly, the driven pin 17c can be set out of the range of the operation stroke S. The above mentioned position is shown by dash and double dotted line in FIG. 10. In order to hold down the driven pin 17c to temporarily maintain the lens holding frame 17, a cylindrical lens holding member 13a is provided with an elastic holding arm. The holding arm 13b are formed opposite to a flat 35e of the cylindrical lens holding member 13a at a predetermined distance, and temporarily holding click 13c are formed on the surface of the cylindrical lens holding member 13a opposite to the holding arm 13b. When the driven pin 17c is at the position indicated by the dash and double doted line in FIG. 10, the driven pin 17c is at the position indicated by (a) in FIG. 11, and is kept between the holding arm 13b and the click 13c. In this state, the lens holding frame 17 is maintained on the cylindrical lens holding member 13a and can be transferred to an assembly site.

In this position the driven pin 17c is between the paired lens driving pins 33b, and when the selector member 33 is first moved after the assembly the driven pin 17c is driven by the lens driving pins 33b on the left side for the object facing the unit, and freed from the restriction between the holding arm 13b and click 13c. Thereafter, the driven pin 17c moves within the smaller stroke than that of the selector member 33 as mentioned above, the driven pin 17c does not come under the holding arm 13b.

In the illustrated embodiment of the present invention, as shown in FIG. 1 and FIG. 5, a finder frame 43 is formed integrally with the selector member 33 on the top whereof The finder frame 43 is provided with a opening 43a transversally near the middle that aligns the finder window 27 of the basic portion 3a of the unit body 3 in the normal photographing condition wherein the selector member 33 is positioned on the right side facing the object. On the right of the opening 43a facing the object, a close-up field frame is formed to indicate the photographing field in close-up photographing. Opposite side of the close-up field frame 43b with the opening 43a between is a light limiting portion 43c that covers the light emitting portion 23a except for the both ends of the light emitting portion 23a when the selector member 33 is at the position of close-up photographing. This finder frame 43 moves transversally along the front side of the front cover 3b between the front cover 3b of the basic portion 3 and the outer cover 31 following the transversal movement of the selector member 33.

Figure 13:
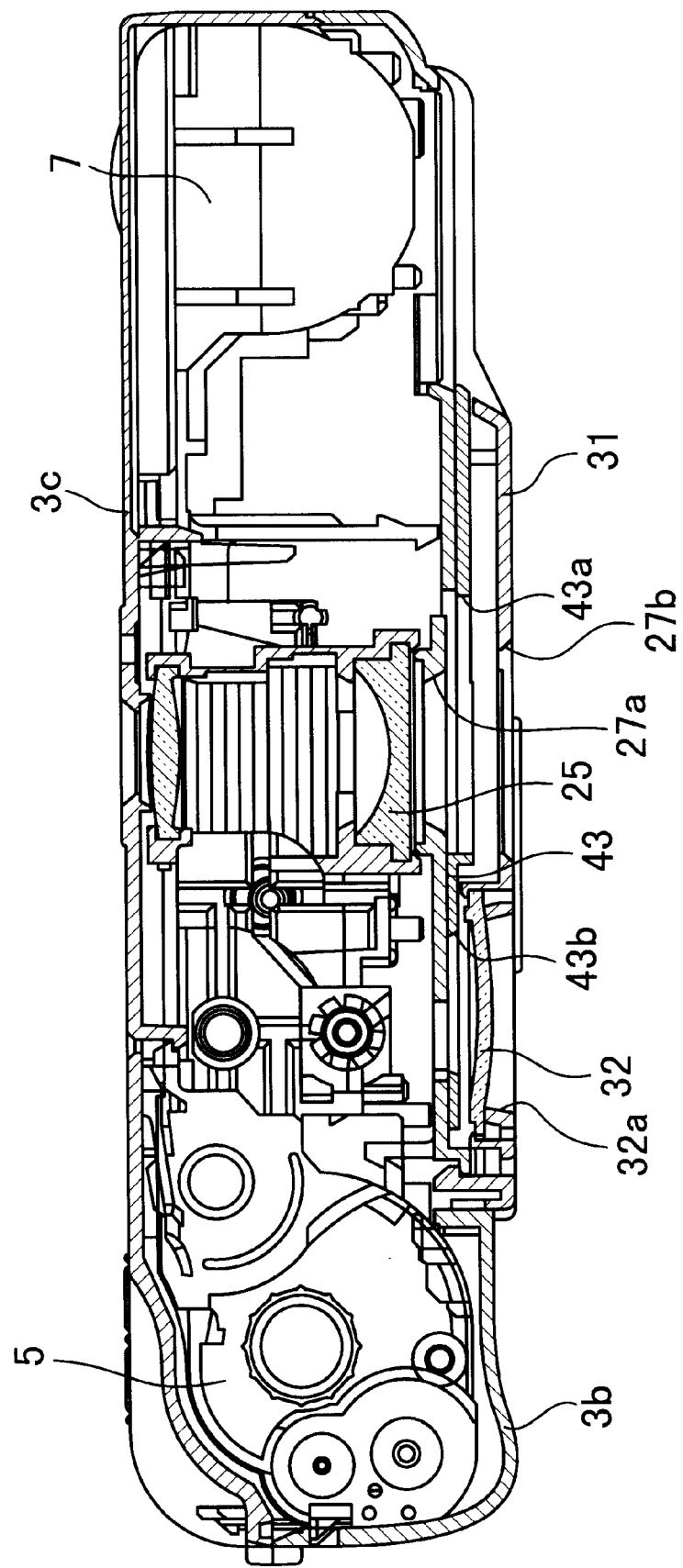
FIG. 13 is a horizontal sectional view illustrating a finder mechanism in one embodiment of the present invention.

FIG. 13 is a transverse cross-section to illustrate the location of the finder frame 43 when the selector member 33 is in the normal photographing position. The opening 43a of the finder frame 43 is aligned with the finder window 27a of the front cover 3b, and the photographer looks at the object through the finder objective lens 25 fixed in the finder window 27 to determine a planning. At that time, the light limiting portion 43c of the finder frame 43 is between a light emitting portion 23a and the finder window 27, and the light emitting portion 23a is in exposed state as a whole. Also, the close-up field frame 43b of the finder frame 43 is on the backside of the reflective mirror 32.

Now in case the selector member 33 is move to the left facing to the object, as mentioned before, the taking lens 19 is forwarded to be in the close-up photographing position, and at the same time, the finder frame 43 moves to the same direction to be the state illustrated in. At this position the close-up field frame 43b enters the finder window 27b, and the photographer can check the range of close-up photographing by way of the close-up field frame 43b. Also, when a photographer is to take a self-portrait in the photographing range, the photographer can check the photographing range by the reflective mirror 32 from the front side of the lens-fitted film unit 1. Moreover, in this close-up photographing position, the light limiting portion 43c formed in the finder frame 43 is positioned in front of the flash window 23d of the front cover 3b, covering almost all of the flash unit 23 except for the both sides whereof, the light from the flashing unit is emitted only from the both sides of the light limiting portion 43c, thus the quantity of the emitted light is limited. Therefore, by this construction the overexposure in close-up photographing can be avoided. In the present embodiment, a target mark 45 to be the target in close-up photographing is provided in the close-up field frame 43b. The target mark 45 is to show the central part of the photographing range in close-up photographing to the photographer.

Figure 14:
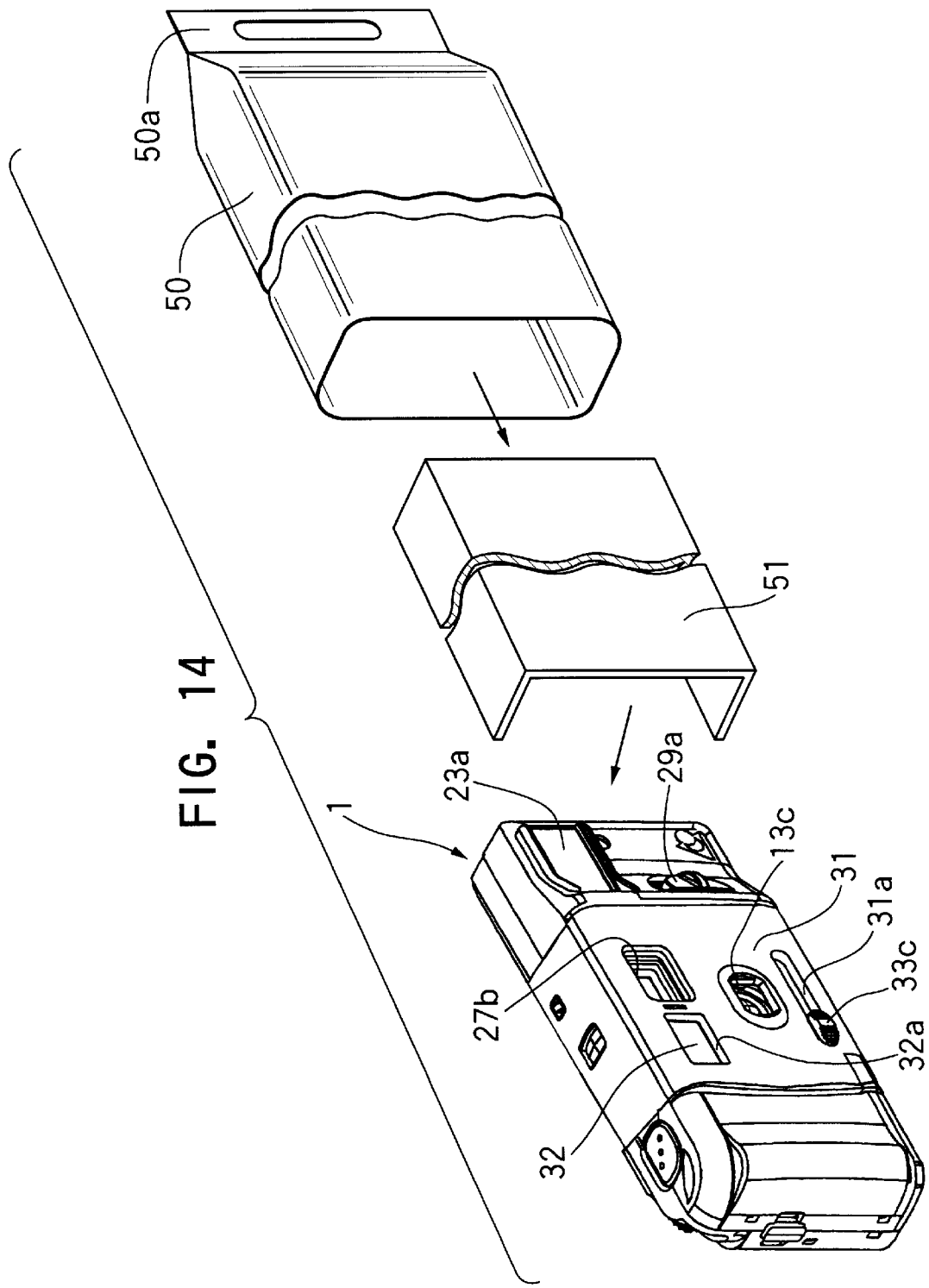
FIG. 14 is a perspective view illustrating an external view of a lens-fitted film unit and a packaging form in accordance with one of embodiment of the present invention.

FIG. 14 is a perspective view illustrating an external view of a completed lens-fitted film unit 1 and an example of packaging whereof. As shown in the figure, the top of the selector knob 33c is most protruding in the whole lens-fitted film unit 1. In the packaging form shown in FIG. 14, the lens-fitted film unit 1 is packaged into a gadget bag 50. The gadget bag 50 is closed at a longitudinal end by a flat adhering portion 50a and the other end is left open, wherefrom a lens-fitted film unit 1 is inserted, and the open end is closed to make a same form as the adhering portion 50a and complete the packaging form. In this packaging form, the form of the most protruding selector member 33 of the lens-fitted film unit 1 appears in deformation of packaging material to damage the quality of packaging. In the embodiment described here, the top of the selector knob 33c is the most protruding part, while in a lens-fitted film unit without the focus adjustment mechanism of a taking lens, the circular protrusion around the taking lens is the most protruding part. In order to treat this problem, a method to cover the front part of the lens-fitted film unit 1 with relatively rigid cover paper 51 and pack into the gadget bag 50, is adopted.

Figure 15:
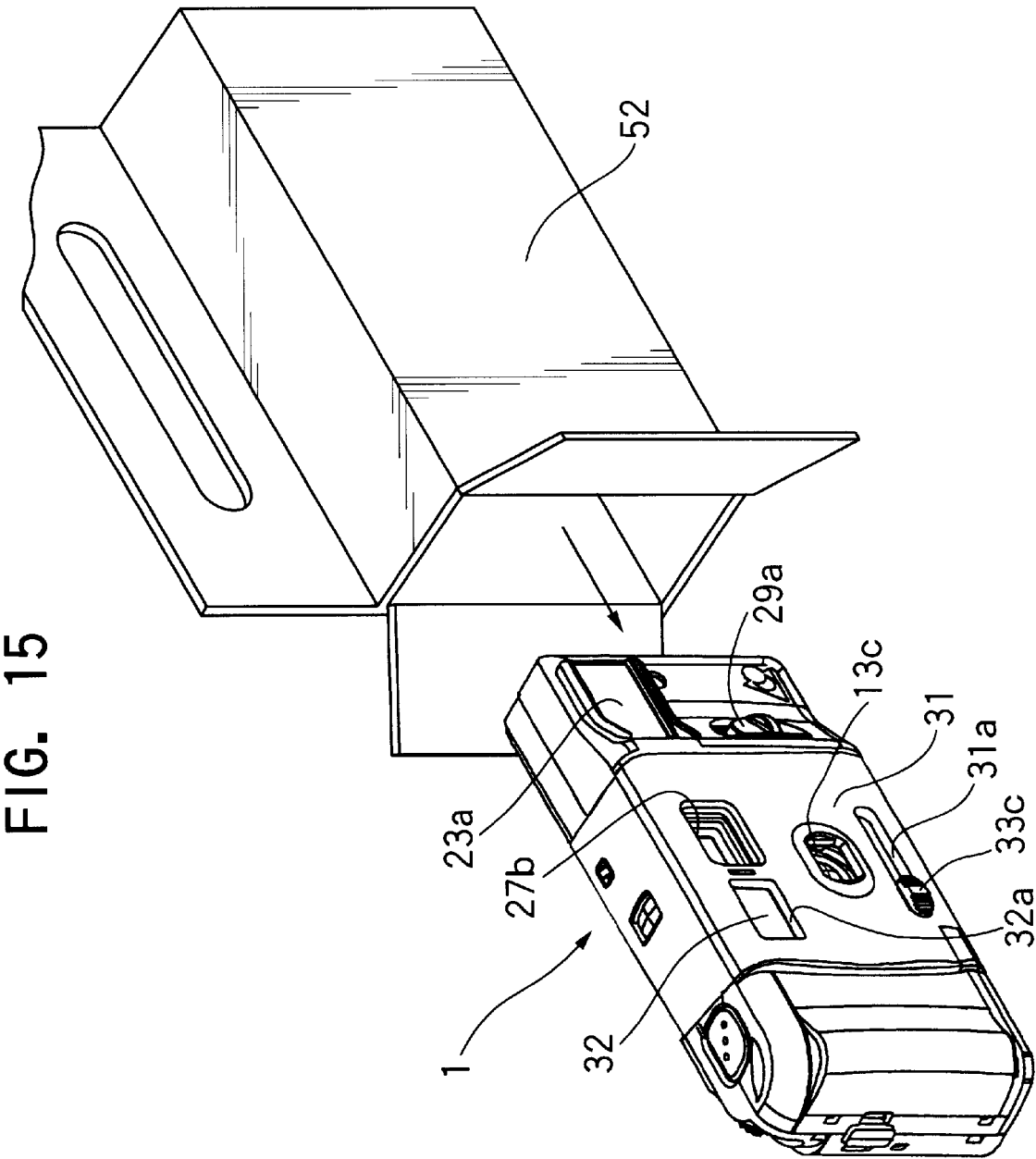
FIG. 15 is a same perspective view as FIG. 14 illustrating another packaging form.
Figure 16A:
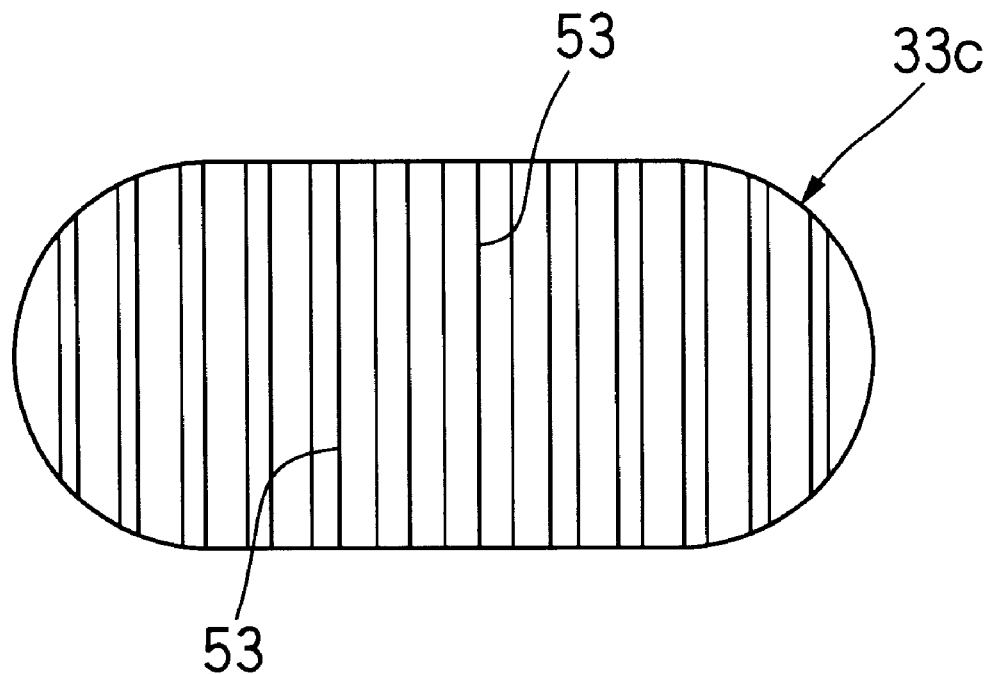
FIG. 16 illustrates an example of a form of a selector knob in a focus adjusting mechanism of the taking lens, (a) being a top view, (b) a cross-sectional view.
Figure 16B:
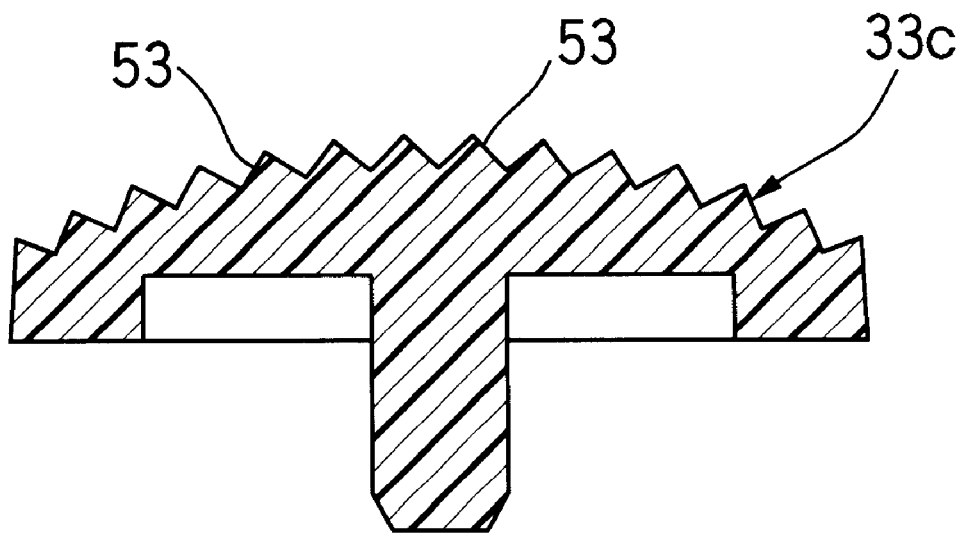

FIG. 15 illustrates another packaging form of a lens-fitted film unit 1, wherein a packaging box 52 formed with card board is used, and in the packaging box 52 the lens-fitted film unit 1 is packaged. In FIGS. 16(a) and (b), an example of the form of the selector knob 33c provided on the selector member 33 is shown. In this form, a plurality of lateral stripes of ridges 53 are formed longitudinally paralleled to give a better view. The stripes of ridges 53 have pointed tops, as shown in FIG. 16(b).

In case the selector knob 33c of such a form protruding forwards on the lens-fitted film unit 1, packaged in such packaging forms as shown in FIG. 14 or FIG. 15, the tops of the stripes of ridges 53 are rubbed by the cover paper 51 or the packaging box 52 to cause function because of the vibration imposed on the lens-fitted film unit 1 during the transport of the lens-fitted film unit 1. Similar problems are to be experienced by a lens-fitted film unit without focus adjusting mechanism of a taking lens if, for example, the unit has a circular protrusion around the taking lens most projecting forwards in the unit, and the circular protrusion is so designed to have decorations like the stripes of the ridges 53.

FIG. 17 shows some means to solve the problems, and FIGS. 17(a),(b) show an example, wherein the main capacitor 23c is provided with a laterally elongated protrusion 54 in the middle of the length and a flat 54a is formed on the top of the protrusion 54. The flat 54a is 0.5 mm or more in width. By forming a flat like the flat 54a on the most protruding part of the selector knob 33c, wear on the top of the selector knob 33c can be prevented.

FIGS. 17(c) and (d) show another example, wherein the selector knob 33c has several ridges 53 on the top whereof like the example in FIG. 16. However, in the present example, different from the example in FIG. 16, a relatively wide flat 55 is formed in the middle of the length of the selector knob 33c. In the middle of selector knob 33c, a substantially rectangular recess 55a is formed. The recess 55 has an effect to prevent contraction strain or shrinkage cavity during cooling process after the casting of the selector knob 33c. Also in this example, if the width of the each flat side of the recess 55a is 0.5 mm or more, the wear of the top of the selector knob 33c by friction with packaging material can be prevented.

Figure 18:
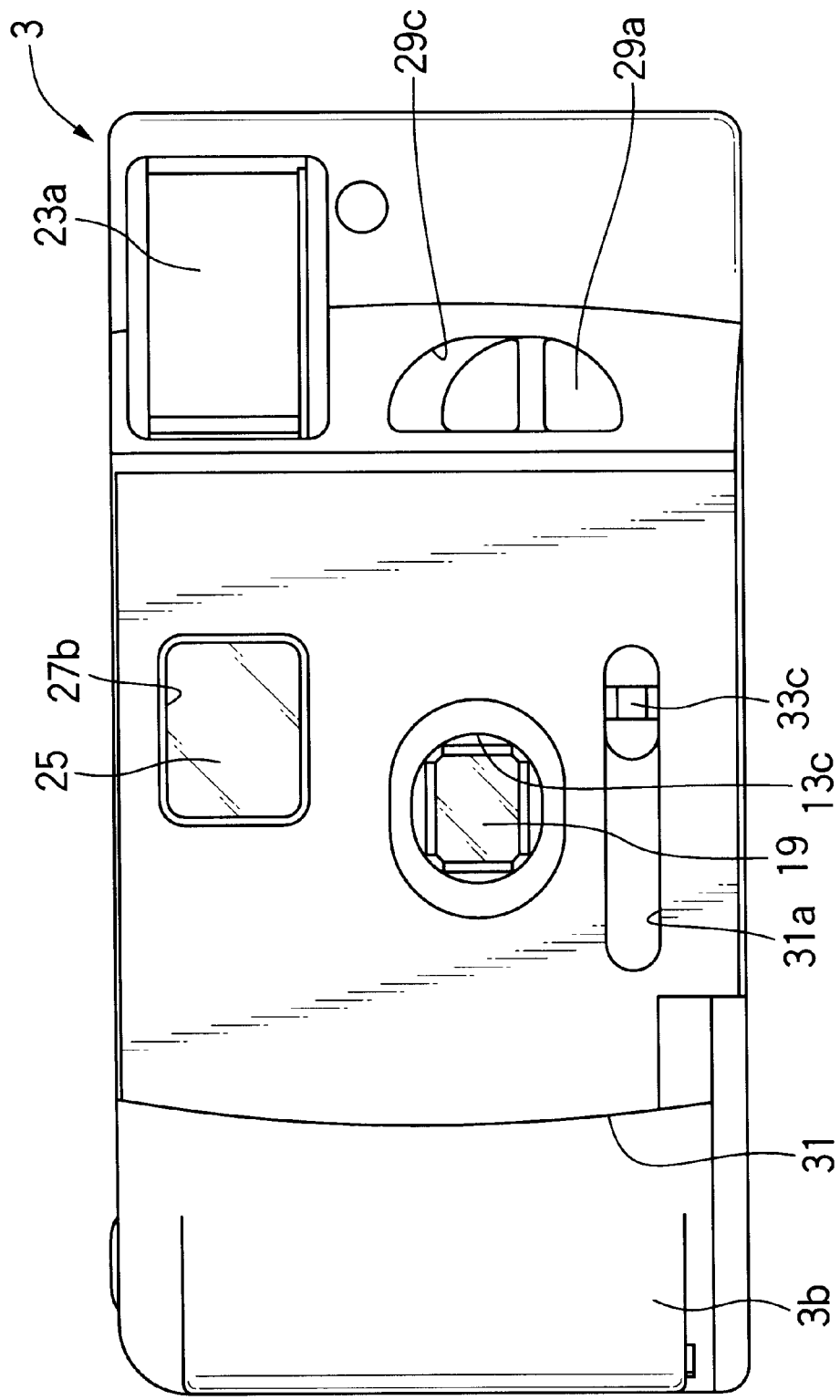
FIG. 18 is a front view of a lens-fitted film unit in another embodiment of the present invention.

In FIG. 18, another embodiment of the present invention is shown. In the embodiment, a front cover 3b is attached in front of the basic portion 3a. The front cover 3b is so formed as to cover almost all the front side of the basic portion 3a, and provided with a finder window 27a aligning with the finder window 27 of the basic portion 3a, a flash window 23d to expose the light emitting portion 23a forwards, a flash switch opening 29b to expose the switch knob 29a on the switch board 29 forwards into the front of the basic portion 3 and a lens opening 13b for the cylindrical lens holding member 13a of the lens holder 13 to pass through. The cylindrical lens holding member 13a extends forwards through the lens opening 13b of the front cover 3b. The outer cover 31 is attached in front of the front cover 3b, and the selector member 33 movable transversally is located between the outer cover 31 and the front cover 3b.

Figure 19:
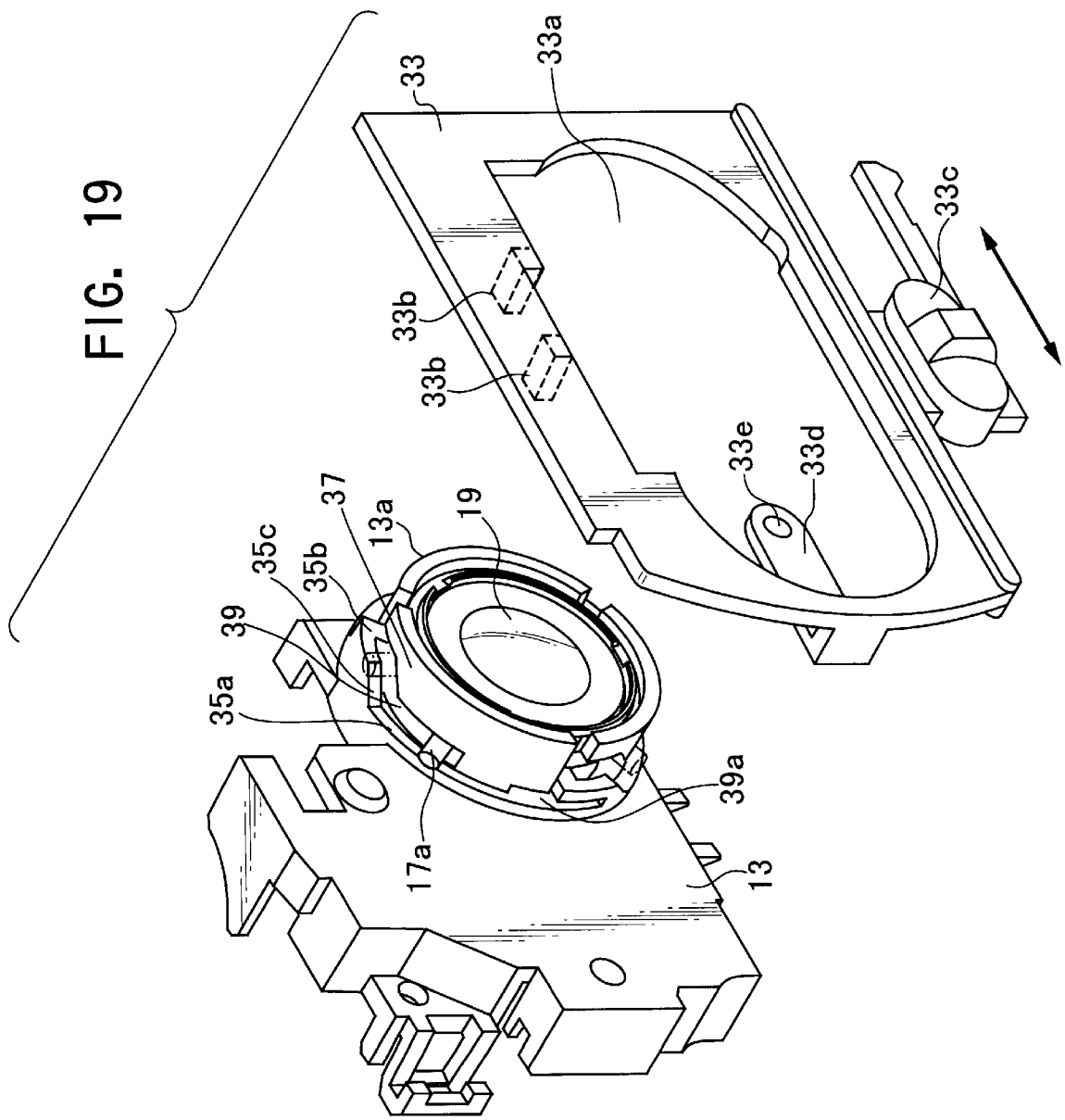
FIG. 19 is an exploded perspective view illustrating a focus adjusting mechanism of the taking lens in one embodiment of the present invention.
Figure 20:
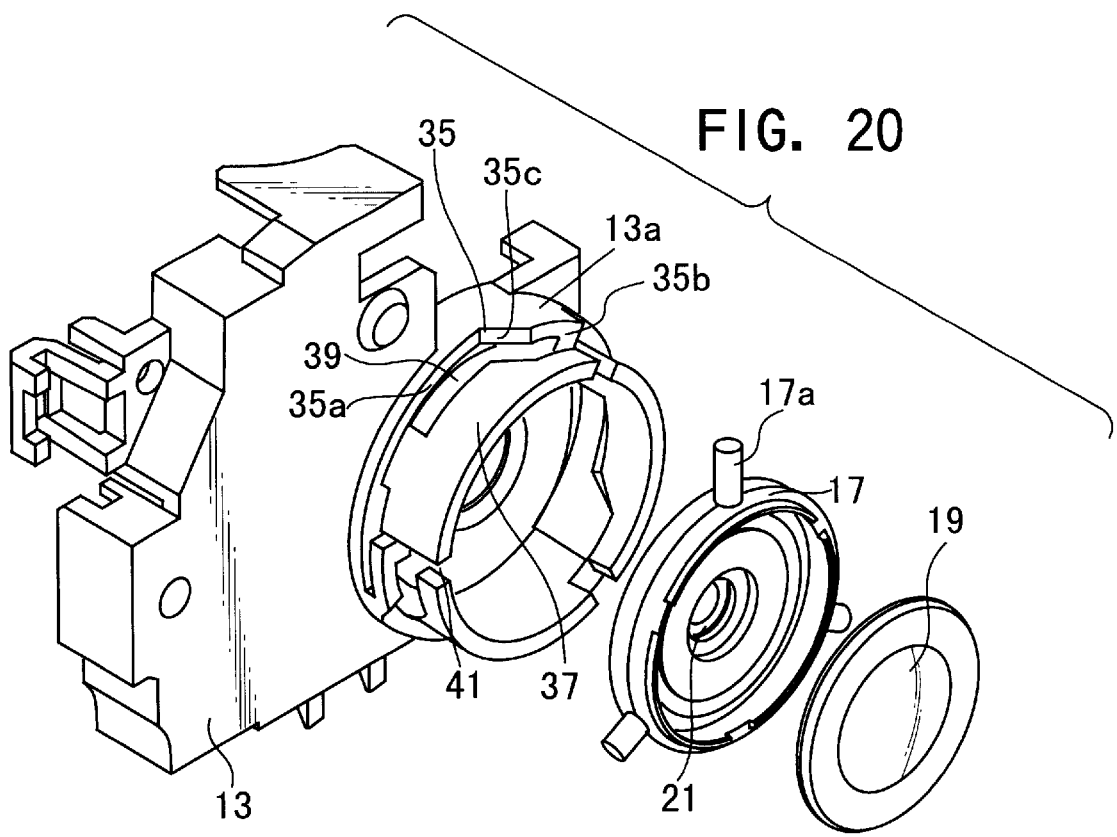
FIG. 20 is an exploded perspective view illustrating an arrangement of a selector member in a focus adjusting mechanism of the taking lens in one embodiment of the present invention.

FIG. 19 and FIG. 20 show the details of another form of the embodiment of a focus adjustment mechanism of a taking lens by the present invention. The cylindrical lens holding member 13a extending forwards from the lens holder 13 has cam surface 35 facing front. In the embodiment illustrated, the cam surface 35 is composed of the first surfaces to locate the taking lens 19 in the recessed position, the second surfaces 35b to locate the taking lens 19 in the projected position, and the slopes 35c to connect the first surfaces 35a and the second surfaces 35b. In front of the cam surface 35, holding portions 37 are formed at a predetermined distance from the cam surface 35. Therefore, cam grooves 39 are formed between the cam surface 35 and holding portions 37. The cam grooves 39 are formed at several positions, for example 3 equally spaced, on the cylindrical lens holding member 13a along the circumferential direction. Between an end of a holding potion 37, constituting a cam groove 39, along the circumferential direction and the opposite end of an adjacent holding portion 37 constituting another cam groove 39, a groove 41 of a predetermined width is formed along the optical axis.

On the lens holding frame 17, a plurality of cam driven pins 17a are formed, for example 3 equally spaced, radially outwards along the circumferential direction. The cam driven pins 17a are inserted into the cam groove 39 by way of the groove 41. The holding portions 37 of the cylindrical lens holding member 13a are elastic, and hold the cam driven legs 17a elastically down onto the cam surface 35. FIG. 5 shows the state of cam driven legs 17a engaging with the cam groove 39.

As shown in FIG. 19, the selector member 33 comprises a frame member having an oblong opening 33a in the middle. The selector member 33 is located between the outer cover 31 and front cover 3b in such a way that the cylindrical lens holding member 13a is inserted into the opening 33a. The selector member 33 is provided with a pair of lens driving pins 33b protruding backward, and between the lens driving pins 33b the driven pin 17c on the lens holding frame 17 is located. In the lower part of the selector member 33 a selector knob 33c is formed to protrude forward from the slit 31a formed on the outer cover 31. Therefore, the selector member 33 can be transferred sideward by operating the selector knob 33c. If the selector member 33 moves sideward, the lens driving pins 33b on the selector member 33 engage with the cam driven legs 17a on the lens holding frame 13a to rotate the lens holding frame 13a. By the rotation of the lens holding frame 13a, the cam driven legs 17a slide on the cam surface 35 to receive the action of the cam, and the cam driven legs 17a moves along the optical axis.

When the selector member 33 is set on the right side facing the object, the cam driven legs 17a engage with the first cam surfaces 35a of the cam surface 35, and when the cam driven legs 17a are so positioned, the lens holding frame 13a and taking lens 19 are positioned in the recessed positions, thus the taking lens 19 is in the position adjusted to focus on a distant object, for example 4 meters. On the contrary, when the selector member 33 is set on the right facing the object and the cam driven legs 17a are on the second cam surfaces 35b of the cam surface 35, the lens holding frame 13a and taking lens 19 are advanced to the front position, thus the taking lens 19 is in the close-up photographing position adjusted to focus on a close object, for example 60 cm.

As shown in FIG. 19, on the right side in the selector member 33 facing the object, an aperture arm 33d is formed to extend sideward in the opening 33a, and at the end whereof a second aperture 33e is formed. The second aperture 33e has a smaller aperture opening than that of the first aperture formed in the lens holding frame 17. When the selector member 33 is moved rightward facing the object and the taking lens 19 is advanced, the aperture arm 33d in the selector member 33 is inserted into the back of taking lens 19 passing through the groove 39a formed in the cylindrical lens holding member 13a. At that time, the second aperture 33e at the end of the aperture arm 33d is positioned in the optical axis of the taking lens 19. Therefore the photographing aperture opening becomes smaller than that of the first aperture, and depth of focus deepens. As a result, the range focused well extends in close-up photographing.

What is claimed is:

1. A lens-fitted film unit including a taking lens of a fixed focal distance and a unit body having a photographing mechanism including a shutter, the body having a cartridge chamber for storing a cartridge shell having a rotable spool attached with an end of a photo-film strip and a film roll chamber for storing a roll of unexposed photo-film withdrawn out of the cartridge shell, a cartridge shell and a roll of unexposed photo-film withdrawn out of the cartridge shell being charged during manufacture in the cartridge chamber and the film roll chamber respectively, the spool being adapted to be rotated to take up an exposed film portion into the cartridge each time a shot is taken, said unit comprising:

a selector member to change a focus adjustment position of the taking lens between a predetermined normal photographing position and a close-up photographing position, a photographing field finder, a cylindrical lens holding member fixed to the unit body, a lens holding frame having the taking lens fixed thereto and positioned in the cylindrical lens holding member for rotation and an axial movement in a direction of an optical axis, a cam mechanism formed between the cylindrical lens holding member and the lens holding frame, the cam mechanism including a cam surface formed in front of the cylindrical lens holding member, at least one engaging leg protruding backwards in the direction of the optical axis from the backside of the lens holding frame to engage with the cam surface on the cylindrical lens holding frame, and a spring for resiliently biasing the lens holding frame towards the cylindrical lens holding member, the lens holding frame being provided with a driven member protruding radially outwards, the selector member having a lens driving member to engage with the driven member of the lens holding frame, the selector member being arranged in the unit body and movable between a normal photographing position and a close-up photographing position, the movement of the selector member causing the lens holding frame to rotate by way of the engagement of the driven member of the lens holding member with the lens driving member of the selector member, to thereby cause the lens holding frame to move in the direction of the optical axis by under an influence of the cam mechanism, a reflection mirror provided in the vicinity of the photographing field finder to make it possible to observe a filed of photographing field from front side in the close-up photographing.

2. A lens-fitted film unit as claimed in claim 1, wherein said selector member is integrally formed with a parallax compensating close-up field frame, which is adapted to be placed over the photographing field finder when the selector member is at the close-up photographing position to indicate an area of he close-up photographing, a target mark being provided in the close-up field frame to indicate a specific position in the photographing area during the close-up photographing.

3. A lens-fitted film unit as claimed in claim 1, wherein the spring is a coil spring arranged between an outer cover of the unit body and the lens holding frame.

4. A lens-fitted film unit as claimed in claim 3, wherein a cylindrical spring support is formed around the photographing opening on the outer cover to be inserted into one end of the coiled spring, and the cylindrical coil support is larger in diameter than the inner diameter of the end of the coiled spring so that the coil spring is expanded radially to have the coil support to be inserted.

5. A lens-fitted film unit as claimed in claim 1, wherein the lens driving member of the selector member consists of a pair of lens driving pins arranged so as to protrude in the direction of the optical axis from the selector member and to align in the direction of the motion of the selector member, the driven member of the lens holding member being a driven pin located between the pair of lens driving pins, the driven pin being arranged so that it is driven by one of the driving pins when the selector member moves in one direction, and by the other driving pin when the selector member moves to the other direction.

6. A lens-fitted film unit as claimed in claim 5, wherein the distance of the movement of the pair of the driving pins in the direction of the movement of the selector member is 2 to 5 times as large as the diameter of the driven pins, and when the selector member moves in one direction, in the state that one of the lens driving pins is engaging with the driven pin, a predetermined space corresponding to the difference of the distance between the pair of driving pins and the diameter of the driven pin is maintained between the driven pin and the other lens driving pin, and when the selector member moves in the opposite direction, the other lens driving pin engages with the driven pin to drive the driven pin in the direction contrary to the direction after the selector member has made an unloaded movement correspond to the space.

7. A lens-fitted film unit as claimed in claim 1, wherein the selector member is located on backside of an outer cover provided in front of the unit body, a selector knob being provided in the selector member, the selector knob protruding out of a slot formed on the outer cover to be operable with fingers, the selector knob having a front side portion which is the highest part on the front side of the unit, the front side of the selector knob having a flat portion of at least 0.5 mm in width.

8. A lens-fitted film unit as claimed in claim 7, wherein a recess is formed in the flat portion, peripheral flat area being formed on both sides of the recess, and the width of the flats being at least 0.5 mm.

9. A lens-fitted film unit as claimed in claim 1, wherein the selector member is resiliently biased in one direction of movement.

10. A taking lens focus adjusting mechanism for a camera, comprising:

a cylindrical lens holding member secured to a camera body, and provided with cam surfaces at a plurality of positions spaced circumferentially in a front portion thereof, a lens holding frame provided in the cylindrical lens holding member for rotation and movement in the direction of an optical axis, and provided with a pin on a circumference thereof for slidable engagement with the cam surfaces in the cylindrical lens holding member, a taking lens fixed to the lens holding frame, a lens holding frame retaining member made of an elastic material and fixed to the camera body for holding the pin on the lens holding frame between the retaining member and the cam surfaces of the cylindrical lens holding member, and a selector member provided in a front side of the camera body for movement to one of a plurality of predetermined positions along the front side of the camera, the movement of the selector member causing the selector member to engage with the pin of the lens holding frame to thereby cause the lens holding frame to rotate, for producing a movement of the lens holding frame in the direction of the optical axis by engagement between the pin and the cam surface.

11. A taking lens focus adjusting mechanism for a camera, comprising:

a cylindrical lens holding member fixed to the unit body and provided with a cam so formed as to penetrate from an inner circumference to an outer circumference of the holding member at circumferentially spaced positions the cam having a front surface providing cam surfaces, a lens holding frame provided in the cylindrical lens holding member for rotation and an axial movement in the direction of optical axis, said lens holding frame having a taking lens fitted thereto, said lens holding frame being provided on its circumference with a pin for engagement with the cam of the cylindrical lens holding member said pin on the lens holding member protruding out of the cylindrical lens holding member outwardly, and a selector member provided in a front side of the camera body for movement to one of a plurality of predetermined positions along the front side of the camera, the selector member being adapted upon movement to engage the pin of the lens holding frame to thereby cause the lens holding frame to rotate, and to cause the lens holding frame to move in the direction of the optical axis by engagement between the pin and the cam surface.

12. A focus adjusting mechanism of a taking lens as claimed in claim 11, wherein the selector member is a frame member provided in the middle portion thereof with an elongated opening, the lens holding frame being arranged so as to extend through the opening of the frame member, the lens holding frame driving pins being formed on a back side of the frame member in such a way as to protrude backward, the lens holding frame driving pins being adapted to engage with the pin on the lens holding frame to rotate the lens holding frame.

13. A lens-fitted film unit, having a unit body and including a taking lens in front of the unit body and a photographing mechanism with a shutter in said unit body, the unit body having a cartridge chamber for storing a cartridge shell having a rotatable spool fixed to an end of a photo-film strip and a film roll chamber for storing a roll of unexposed photo-film withdrawn out of the cartridge shell, a cartridge shell and a roll of unexposed photo-film withdrawn out of the cartridge shell being charged in the cartridge chamber and the film roll chamber respectively during manufacture in advance, whereby the spool is rotated to take up an exposed film portion into the cartridge each time a shot is taken, comprising:

a cylindrical lens holding member fixed to the unit body, provided with a cam so formed as to penetrate from an inner circumference to an outer circumference at circumferentially spaced positions, the cam having a front surface providing cam surfaces, a lens holding frame having a taking lens fixed thereto, said lens holding frame being in the cylindrical lens holding frame for rotation and an axial movement along an optical axis, said lens holding frame being provided with a pin for engagement with the cam, said pin projecting out of the outer surface of the cylindrical lens holding member, and a selector member located in a front side of a camera body for a sideward movement selectively to one of a plurality of predetermined positions, engaging with the pin on the lens holding frame to rotate the lens holding frame upon the sideward movement, and transferring the lens holding frame in the direction of the optical axis by engagement of the pin and the cam surface, and the selector member being a frame member provided with an elongated opening in the middle portion thereof, the lens holding frame being arranged to project through said opening in the frame member, the frame member being provided with lens holding member driving pin projecting backward from back side of the frame member, the lens holding member driving pin engaging with the pin on the lens holding frame to cause rotation of the lens holding frame.

14. A lens-fitted film unit as claimed in claim 13, wherein an outer cover member is attached to the front side of the unit body so as to cover the frame member constituting the selector member.

15. A taking lens focus adjusting mechanism as claimed in claim 10, wherein;

a first aperture is provided on the lens holding frame, a second aperture with a smaller aperture opening than that of the first aperture being fixed to the selector member, the second aperture being adapted to be located in the optical axis at one of the plurality of predetermined positions of the selector member.

\* \* \* \* \*